US 8,705,974 B2

(12) United States Patent
Koganei et al.

(10) Patent No.: US 8,705,974 B2
(45) Date of Patent: Apr. 22, 2014

(54) OPTICAL TRANSMISSION SYSTEM AND OPTICAL TRANSMISSION METHOD

(75) Inventors: Yohei Koganei, Kawasaki (JP);
Masahiro Shioda, Kawasaki (JP);
Osamu Takeuchi, Kawasaki (JP);
Hayato Furukawa, Kawasaki (JP);
Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 219 days.

(21) Appl. No.: 13/412,156

(22) Filed: Mar. 5, 2012

(65) Prior Publication Data

US 2012/0219282 A1    Aug. 30, 2012

Related U.S. Application Data

(63) Continuation of application No. PCT/JP2009/065835, filed on Sep. 10, 2009.

(51) Int. Cl.
*H04B 10/00*    (2013.01)

(52) U.S. Cl.
USPC ........................... 398/138; 398/139; 398/136

(58) Field of Classification Search
USPC ................................. 398/135–139
See application file for complete search history.

(56) References Cited

U.S. PATENT DOCUMENTS

| | | | |
|---|---|---|---|
| 6,381,243 B1 | 4/2002 | Ekstedt | |
| 7,362,779 B1 * | 4/2008 | Zabezhinsky | 370/512 |
| 7,839,839 B2 * | 11/2010 | Brown et al. | 370/350 |
| 8,125,979 B2 * | 2/2012 | Caggioni et al. | 370/351 |
| 8,204,087 B2 * | 6/2012 | Shin et al. | 370/543 |
| 8,205,141 B2 * | 6/2012 | Caggioni et al. | 714/776 |
| 2009/0087194 A1 | 4/2009 | Nakashima et al. | |
| 2010/0142525 A1 * | 6/2010 | Cho et al. | 370/389 |
| 2010/0281343 A1 * | 11/2010 | Caggioni et al. | 714/776 |
| 2012/0219282 A1 * | 8/2012 | Koganei et al. | 398/1 |

FOREIGN PATENT DOCUMENTS

| | | |
|---|---|---|
| EP | 1 114 568 | 7/2001 |
| EP | 2 045 935 A2 | 4/2009 |
| JP | 2002-526002 | 8/2002 |
| JP | 2009-89194 | 4/2009 |
| WO | 00/18179 | 3/2000 |

OTHER PUBLICATIONS

International Search Report of PCT/JP2009/065835 mailed Dec. 22, 2009.

* cited by examiner

*Primary Examiner* — Agustin Bello
(74) *Attorney, Agent, or Firm* — Staas & Halsey LLP

(57) ABSTRACT

An optical transmission system transmits an optical signal of multi-level modulation. In a transmitter module, a data string in a specified frame is rearranged into a plurality of logical lanes. A lane ID, which specifies in what logical lane out of the plurality of logical lanes a start of the data string is arranged, is assigned to a non-scrambled area in an overhead portion of the frame. The lane ID corresponding to one of the plurality of logical lanes is different from the lane IDs corresponding to the other remaining logical lanes. The optical signal is generated using the data string rearranged into the plurality of logical lanes. In a receiver, the lane ID is detected according to a majority method. The inversion of bits and the swapping of lanes are detected using the lane ID and compensated.

8 Claims, 24 Drawing Sheets

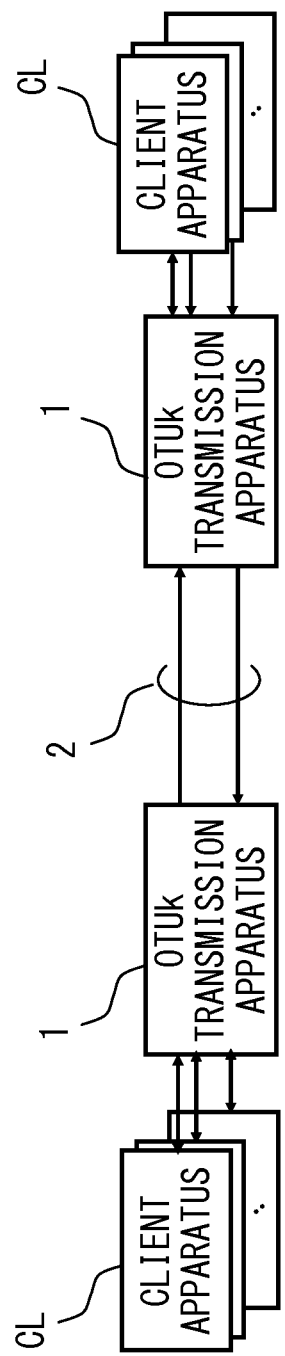
F I G. 1

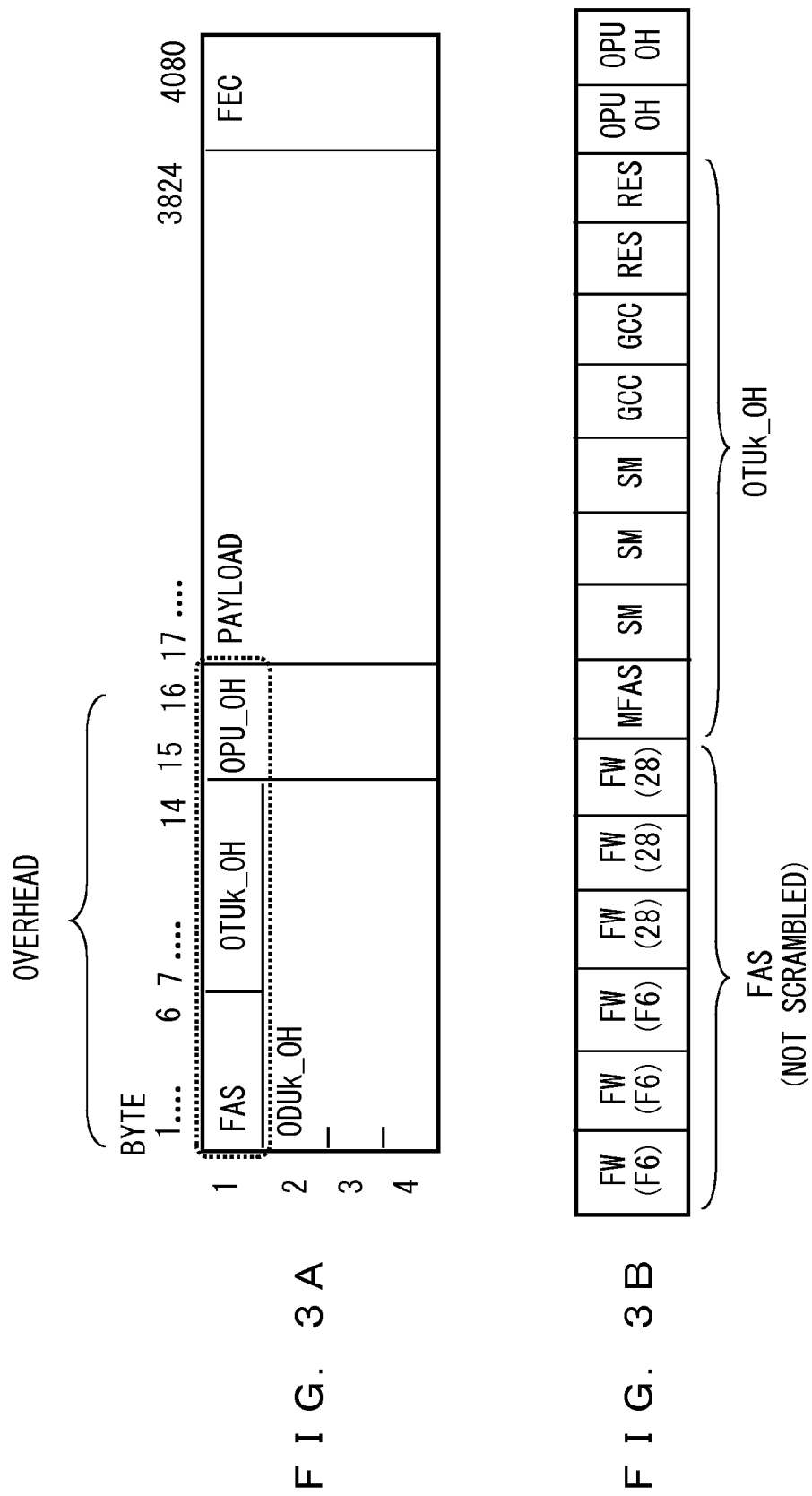
F I G. 3 A
F I G. 3 B

| 1 : 16 (FAS) | 17 : 32 | 33 : 48 | 49 : 64 | ... | 4065 : 4080 |
|---|---|---|---|---|---|
| 4081 : 4096 | 4097 : 5012 | 5013 : 5028 | 5029 : 5044 | ... | 9145 : 9160 |
| 9161 : 9176 | 9177 : 9192 | 9193 : 9208 | 9209 : 9224 | ... | 12225 : 12240 |
| 12241 : 12256 | 12257 : 12272 | 12273 : 12288 | 12289 : 12304 | ... | 16305 : 16320 |

| LOGICAL LANE | 5:1 MULTIPLEXING | | | | |
|---|---|---|---|---|---|
| 1 | 5 | 4 | 3 | 2 | 1 |
| 2 | | | | | |
| 3 | | | | | |
| 4 | | | | | |
| 5 | | | | | |
| 6 | 10 | 9 | 8 | 7 | 6 |
| 7 | | | | | |
| 8 | | | | | |
| 9 | | | | | |
| 10 | | | | | |
| 11 | 15 | 14 | 13 | 12 | 11 |
| 12 | | | | | |
| 13 | | | | | |
| 14 | | | | | |
| 15 | | | | | |
| 16 | 20 | 19 | 18 | 17 | 16 |
| 17 | | | | | |
| 18 | | | | | |
| 19 | | | | | |
| 20 | | | | | |

| LOGICAL LANE | 2:1 MULTIPLEXING | | 10:4 MULTIPLEXING | | | | | |
|---|---|---|---|---|---|---|---|---|
| 1 | 2 | 1 | 14 | 6 | 17 | 9 | 1 | → X_I |
| 2 | | | | | | | | |
| 3 | 4 | 3 | | | | | | |
| 4 | | | | | | | | |
| 5 | 6 | 5 | 16 | 8 | 19 | 11 | 3 | → X_Q |
| 6 | | | | | | | | |
| 7 | 8 | 7 | | | | | | |
| 8 | | | | | | | | |
| 9 | 10 | 9 | | | | | | |
| 10 | | | | | | | | |
| 11 | 12 | 11 | 18 | 10 | 2 | 13 | 5 | → Y_I |
| 12 | | | | | | | | |
| 13 | 14 | 13 | | | | | | |
| 14 | | | | | | | | |
| 15 | 16 | 15 | | | | | | |
| 16 | | | | | | | | |
| 17 | 18 | 17 | 20 | 12 | 4 | 15 | 7 | → Y_Q |
| 18 | | | | | | | | |
| 19 | 20 | 19 | | | | | | |
| 20 | | | | | | | | |

FIG. 9

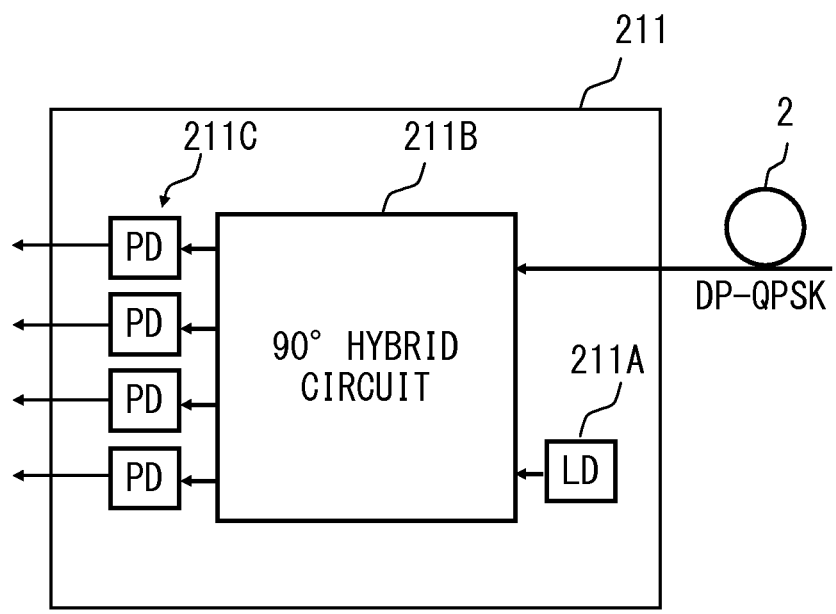
F I G. 1 2

(Q', I)

(I', Q')

(Q, I')

| TRANSMISSION | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| X_I | X_I | X_I | X_I | X_I | X_Q | X_Q | X_Q' | X_Q' | X_Q | X_Q | X_Q | X_Q | X_I' | X_I' | X_I' | X_I' |
| X_Q | X_Q | X_Q | X_Q | X_Q | X_I | X_I | X_I | X_I | X_I' | X_I' | X_I' | X_I' | X_Q' | X_Q' | X_Q' | X_Q' |
| Y_I | Y_I | Y_Q' | Y_Q | Y_Q' | Y_I | Y_Q' | Y_Q | Y_I' | Y_I | Y_Q' | Y_Q | Y_I' | Y_I | Y_Q' | Y_Q | Y_I' |
| Y_Q | Y_Q | Y_I | Y_I' | Y_Q' | Y_Q | Y_I | Y_I' | Y_Q' | Y_Q | Y_I | Y_I' | Y_Q' | Y_Q | Y_I | Y_I' | Y_Q' |

| TRANSMISSION | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| X_I | Y_I | Y_Q' | Y_Q | Y_I' | Y_I | Y_Q' | Y_Q | Y_I' | Y_I | Y_Q' | Y_Q | Y_I' | Y_I | Y_Q' | Y_Q | Y_I' |
| X_Q | Y_Q | Y_I | Y_I' | Y_Q' | Y_Q | Y_I | Y_I' | Y_Q' | Y_Q' | Y_I' | Y_I | Y_Q | Y_Q' | Y_I' | Y_I | Y_Q |
| Y_I | X_I | X_I | X_I | X_I | X_Q' | X_Q' | X_Q' | X_Q' | X_Q | X_Q | X_Q | X_Q | X_I' | X_I' | X_I' | X_I' |
| Y_Q | X_Q | X_Q | X_Q | X_Q | X_I | X_I | X_I | X_I | X_I' | X_I' | X_I' | X_I' | X_Q' | X_Q' | X_Q' | X_Q' |

FIG. 16

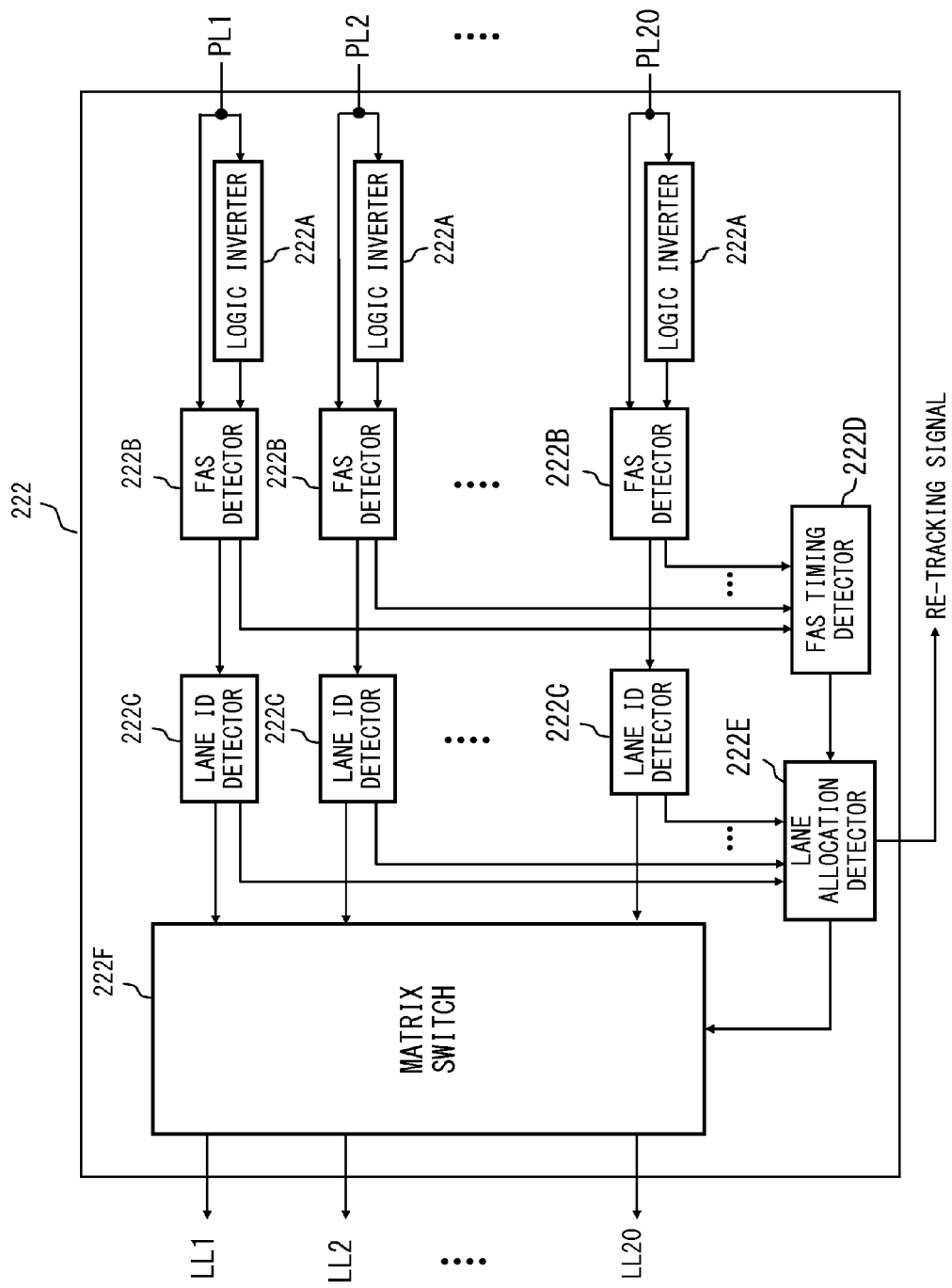
F I G. 17

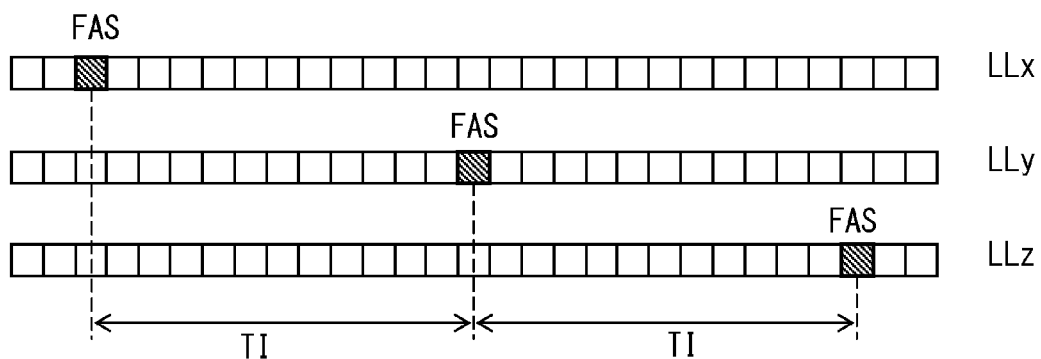
F I G. 1 9 A
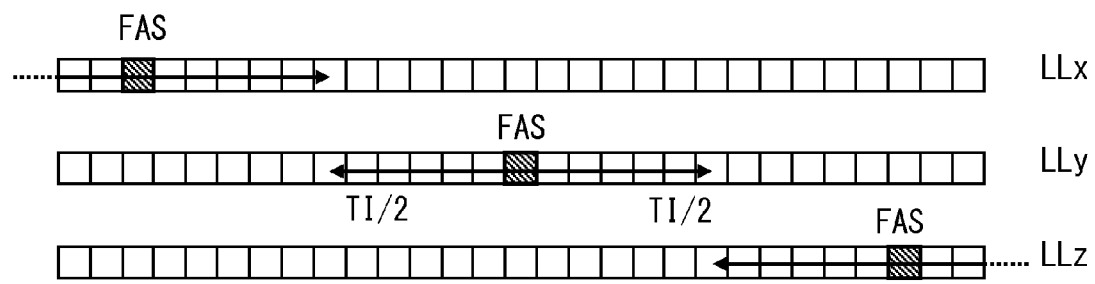
F I G. 1 9 B

| PHYSICAL LANE PL | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| LOGICAL LANE LL | 16 | 17 | 18 | 19 | 20 | 11 | 12 | 13 | 14 | 15 | 6 | 7 | 8 | 9 | 10 | 1 | 2 | 3 | 4 | 5 |
| LOGIC INVERSION | on | on | on | on | on | off | off | off | off | off | off | off | off | off | off | on | on | on | on | on |

F I G. 2 2

| PHYSICAL LANE PL | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| LOGICAL LANE LL | 7 | 19 | 5 | 17 | 3 | 12 | 1 | 10 | 15 | 8 | 13 | 6 | 11 | 20 | 9 | 18 | 4 | 16 | 2 | 14 |
| LOGIC INVERSION | on | off | off | on | off | on | on | on | on | off | off | on | off | on | on | on | on | off | off | on |

F I G. 2 4

OPTICAL TRANSMISSION SYSTEM AND OPTICAL TRANSMISSION METHOD

CROSS-REFERENCE TO RELATED APPLICATION

This application is a continuation of an international application PCT/JP2009/065835, which was filed on Sep. 10, 2009.

FIELD

The embodiments described in this application are related to an optical transmission system and an optical transmission method.

BACKGROUND

In recent years, there has been increasing demand for optical transmission systems that are capable of 40 Gigabit/second (Gbps) or 100 Gbps. In order to achieve such optical transmission systems, there have been attempts to adopt various types of modulation that offer superior efficiency in utilizing the frequency or superior Signal-to-Noise Ratio (SNR) tolerance. In particular, multi-level modulation capable of transmitting multiple-bit information in one symbol time is receiving attention. For example, a technique in which multi-level phase modulation and polarization multiplexing are combined, a technique for performing multi-level quadrature amplitude modulation with the combination of phase and amplitude, or the like are being actively studied.

In optical transmission systems in which the above-described multi-level modulation is adopted, there are some cases in which a signal decoded at the receiving end is received in a state different from that of the original signal modulated at the transmitting end depending on the operating environment of the system, such as the state of transmission lines. For this reason, it is known that the transmission data may not be received correctly due to the occurrence of the logic inversion and a swapping of bits in one symbol time.

As a related technique, a method for detecting and compensating for the logic inversion and swapping of bits has been proposed. According to this method, in an optical transmission system with multi-level modulation using polarization multiplexing, a detecting bit with a specific pattern which is set according to the number of bits to be transmitted in one symbol time is given to a transmission signal, and an optical signal which is modulated according to the transmission signal is transmitted from an optical transmitter to a transmission line. The optical receiver detects and compensates for the logic inversion or bit swap (the swapping of bits) of the received data by using the detecting bit included in a received signal. (For example, see Japanese Laid-open Patent Publication No. 2009-89194)

As another related technique for processing a transmission signal and a reception signal, a method for rearranging the data stored in a specific frame into a plurality of logical lanes and performing signal processing on each of the logical lanes is known. In this method, for example, when the data of a plurality of frames is divided into logical lanes, the data is rearranged while rotating the logical lanes. (For example, see U.S. Pat. No. 7,362,779)

In the above-mentioned compensation method in the related art, a pattern of detecting bits is configured so as not to be dependent upon a logic inversion and a bit swap, and by detecting a pattern which is not dependent upon a logic inversion at the receiving end, it becomes possible to detect the occurrence of a bit swap. Moreover, by detecting a pattern that is not dependent upon a bit swap at the receiving end, it also becomes possible to detect the occurrence of a logic inversion. However, such processing of a detecting bit at the receiving end, i.e., the process of detecting a pattern which is not dependent upon one of a logic inversion or a bit swap in order to detect the occurrence of the other one of a logic inversion or a bit swap, may cause a logic inversion and a bit swap on the detecting bit itself, and thus the processing time tends to be longer. The above-mentioned signal processing with frame rearrangement helps to reduce the processing time, but does not necessarily prevent the logic inversion and bit swap of the detecting bit itself from occurring. For this reason, the conventional compensation technique has a limitation in detecting and compensating for the logic inversion and bit swap occurring to the reception data at an early stage.

The above-mentioned compensation system in the related art is intended for an optical transmission system with multi-level modulation using polarization multiplexing, but the logic inversion and swapping of bits caused to the reception data depending on the operating environment of the system such as the state of transmission lines may also occur in cases where the optical signal of the multi-level modulation not using polarization multiplexing is transmitted and received. Irrespective of whether or not the polarization multiplexing is used, it is a common problem with optical transmission systems with multi-level modulation that the logic inversion and the bit swap need to be detected at an early stage and compensated for.

In order to deal with the above-discussed problem, the Applicant has disclosed in Japanese Patent Application No. 2009-146056 (hereinafter, this may be simply referred to as "the invention of the prior application"), that the data stored in a specified frame is rearranged into a plurality of logical lanes such that the speed of the signal processing will increase, and that the lane ID, which is used to detect what logical lane out of the logical lanes the start of the data string of a frame is arranged in after the data string is rearranged, is assigned to a non-scrambled area within an overhead part of the frame to transmit the optical signal of the multi-level modulation. According to the invention of the prior application, it is possible to detect an inversion of bits and a swapping of lanes which occur to the reception data depending on the operating environment of the system at an early state by using the lane ID, and it is also possible to compensate for the detected inversion of bits and the swapping of lanes.

However, the invention of the prior application still has a problem in which it is difficult to precisely detect the lane ID at the receiving end when a bit error can occur at a relatively high probability, for example when an optical signal is transmitted at an even higher speed.

The problem of the invention of the prior application will be described in detail. In general optical transmission systems to which the invention of the prior application may be applied, a transmitter unit modulates light in accordance with a data signal to which a FEC (Forward Error Correction) code is added, and the optical signal is transmitted to a receiver unit via a transmission line. The receiver unit receives an optical signal through the transmission line, and performs an error correction by using the FEC code contained in the decoded reception data. The error correction is performed after the data strings are rearranged and the frame is regenerated according to a result of the detection of the lanes of the reception data. For this reason, a desired level of detection accuracy is required for the detection of the lane ID, which is contained in the reception data according to the invention of the prior application, before the error correction is performed by using the FEC code, i.e., on the condition that the bit error rate (BER) is relatively high. However, a sequence number (or continuous values) corresponding to the frame numbers are assigned to the lane IDs according to the invention of the prior application. Thus, when a bit error occurs in the data representing the sequence number, the arrangement of the logical lane is erroneously detected.

SUMMARY

According to an aspect of an invention, an optical transmission system includes a transmitter which transmits to a transmission line an optical signal of multi-level modulation capable of transmitting a plurality of bits in one symbol time, and a receiver which receives the optical signal through the transmission line. The transmitter includes: a frame divider to rearrange a data string stored in a specified frame into a plurality of logical lanes, and to assign a lane ID, which specifies in what logical lane out of the plurality of logical lanes a start of the data string of the frame is arranged after the data string is rearranged, to a non-scrambled area in an overhead portion of the frame; and an optical transmitter module to multiplex the data string rearranged into the plurality of logical lanes by the frame divider according to the multi-level modulation, and to generate the optical signal of the multi-level modulation by modulating a light in accordance with the multiplexed data signal to transmit the generated optical signal to the transmission line. The lane ID corresponding to one of the plurality of logical lanes is different from the lane IDs corresponding to the other remaining logical lanes. The receiver includes: an optical receiver module to recover data from the optical signal and to rearrange a bit string of the data into a same number of physical lanes as that of the plurality of logical lanes; and a frame recovery to detect each of the lane IDs contained in the data string of the physical lanes according to a majority method, to detect an inversion of bits and a swapping of lanes for each of the physical lanes according to the detection result of the lane ID to compensate for the inversion of bits and the swapping of lanes such that the data string of the physical lanes is in a same state as that of the data string of the logical lanes, to rearrange the compensated data string of the logical lanes so as to regenerate the frame, and to remove the lane ID from the non-scrambled area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a configuration of an optical transmission system according to an embodiment.

FIGS. 3A and 3B are diagrams illustrating a structure of an OTUk frame.

FIG. 6 is a diagram illustrating an example of a method for dividing an OTUk frame according to the embodiment.

FIG. 7 is a diagram illustrating a method for rearranging the divided OTUk frames into twenty logical lanes according to the embodiment.

FIG. 8 is a diagram illustrating a method for multiplexing the data string of logical lanes according to the embodiment.

FIG. 9 is a diagram illustrating another method for multiplexing the data string of logical lanes according to the embodiment.

FIG. 12 is a block diagram illustrating an example of the configuration of an optical receiver for DP-QPSK according to the embodiment.

FIG. 16 is a diagram illustrating the combinations of reception states that may occur at the time of transmitting an optical signal in DP-QPSK.

FIG. 17 is a block diagram illustrating an example of a circuit of a compensator according to the embodiment.

FIGS. 19A and 19B are diagrams illustrating the timing at which the FAS appears among a plurality of logical lanes.

FIG. 22 is a diagram illustrating a table of physical lanes and logical lanes of FIG. 21.

FIG. 24 is a diagram illustrating a table of the physical lanes and the logical lanes of FIG. 23.

DESCRIPTION OF EMBODIMENTS

Figure 2:
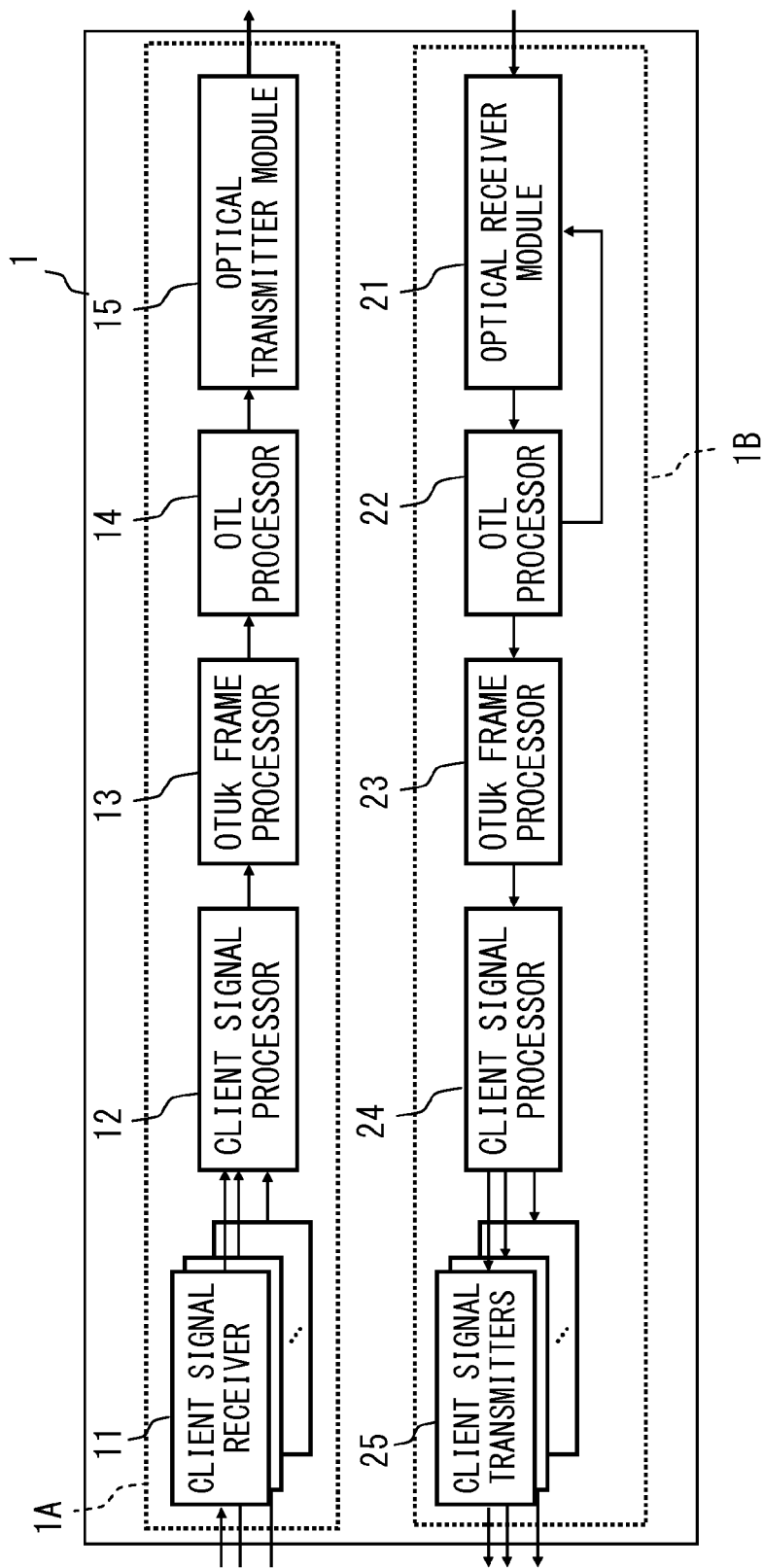
FIG. 2 is a block diagram illustrating an example of the configuration of an OTUk transmission apparatus according to the embodiment.

Some embodiments of the present invention will be described in detail with reference to the accompanying drawings.

FIG. 1 is a diagram illustrating a configuration of an optical transmission system according to an embodiment of the present invention.

In FIG. 1, an optical transmission system according to the present embodiment includes, for example, two OTUk transmission apparatuses 1 to each of which one or a plurality of client apparatuses CL are connected, and transmission lines 2 which connect between the OTUk transmission apparatuses 1.

The OTUk transmission apparatus 1 adds a plurality of pieces of overhead information or the like to the client signal sent from respective client apparatus CL to form a frame structure that corresponds to an OTU (Optical channel Transport Unit) k that meets the OTN (Optical Transport Network) standards. Moreover, the OTUk transmission apparatus 1 rearranges the data string stored in an OTUk frame into a data string composed of a plurality of logical lanes in accordance with an OTL (Optical channel Transport Line). At this time, the OTUk transmission apparatus 1 sets a lane ID, which enables the detection of what logical lane out of a plurality of the logical lanes the start of the data string of an OTUk frame is arranged in when the data is processed at the receiving end, to the data string of the respective logical lanes. Note that the logical lanes are equivalent to the parallel signals obtained by performing serial-parallel conversion on the high-speed transmission signals used in the OTUk transmission apparatus 1. Moreover, the number of logical lanes corresponds to the number of parallel signals. Furthermore, the OTUk transmission apparatus 1 multiplexes the data string of the logical lanes according to the multi-level modulation of an optical signal to be transmitted to the transmission line 2, and transmits the multi-level modulated optical signal through the transmission line 2 by using the multiplexed signal.

When a skew which represents the difference in timing of the received data at each lane is within a half of the time period corresponding to the frame length of the OTUk frame which is divided by the number of the logical lanes, the lane ID assigned to the data string of the logical lanes is set such that only the lane ID corresponding to one of the logical lanes becomes different from the lane IDs corresponding to the other remaining logical lanes. In the above-mentioned invention of the prior application, sequence numbers corresponding to the frame numbers in the order of arranging the frames are assigned as the lane IDs that correspond to the logical lanes. Thus, the way of setting the lane IDs is different between the present embodiment and the invention of the prior application.

Moreover, the OTUk transmission apparatus 1 receives the optical signal transmitted through the transmission line 2 and converts the received optical signal into an electric signal, and after regenerating the reception data by performing a decoding process on the electric signal, rearranges the bit string of the reception data into the same number of physical lanes as that of the rearranged logical lanes at the transmitting end. Then, the OTUk transmission apparatus 1 detects the pattern of the FAS contained in the data string of the respective physical lanes to detect the lane IDs set on the respective FASs according to a majority method, and according to a result of the detection of the FAS, the OTUk transmission apparatus 1 detects the occurrence of the inversion of bits and the swapping of lanes for each physical lane to compensate for the inversion of bits and the swapping of lanes. Note that the respective physical lanes are decided depending on the structure of a circuit that performs a reception signal processing, and the order of the respective physical lanes is arbitrarily determined irrespective of the order of the respective logical lanes at the transmitting end. Furthermore, the OTUk transmission apparatus 1 regenerates the OTUk frame by using the respective data strings in which the inversion of bits and the swapping of lanes are compensated for, and converts the data stored in the OTUk frame into a client signal to transmit the client signal to the corresponding client apparatus CL.

Note that the OTN is an optical network system standardized by ITU-T (International Telecommunication Union Telecommunication Standardization Sector). Moreover, the OTUk corresponds to either OTU3 capable of 40 Gbps or OTU4 capable of 100 Gbps, which are defined in OTN. Furthermore, the OTL is a scheme for performing a signal processing by utilizing a lane defined by G.709 that is being established by ITU-T.

FIG. 2 is a block diagram illustrating an example of the configuration of the OTUk transmission apparatus 1.

In FIG. 2, the OTUk transmission apparatus 1 includes a transmitter unit 1A and a receiver unit 1B. The transmitter unit may be referred to as a transmitter. Similarly, the receiver unit may be referred to as a receiver. The transmitter unit 1A receives a (electric or optical) client signal sent from the client apparatus CL and transmits a multi-level modulated optical signal to the transmission line 2. The receiver unit 1B receives the multi-level modulated optical signal through the transmission line 2 and sends the (electric or optical) client signal to the client apparatus CL.

The example in which the OTUk transmission apparatus 1 includes both the transmitter unit 1A and the receiver unit 1B has been described above. However, the present invention is not limited to such an example. For example, the OTUk transmission apparatus 1 connected to one end of the transmission line 2 may include the transmitter unit 1A, and the OTUk transmission apparatus 1 connected to the other end of the transmission line 2 may include the receiver unit 1B.

The transmitter unit 1A includes, for example, a plurality of client signal receivers 11, a client signal processor 12, an OTUk frame processor 13, an OTL processor 14, and an optical transmitter module 15. The OTL processor 14 is an example of a frame divider.

The client signal receivers 11 correspond to the respective client apparatuses CL connected to the OTUk transmission apparatus 1, and receive the client signals sent from the respective client apparatuses CL. In a case where the client signal is an electric signal, the client signal receiver 11 outputs the electric signal to the client signal processor 12. In cases where the client signal is an optical signal, the client signal receiver 11 converts the optical signal into an electric signal to output the electric signal to the client signal processor 12.

The client signal processor 12 terminates the signal from the client signal receivers 11 and outputs the terminated signal to the OTUk frame processor 13.

The OTUk frame processor 13 adds the overhead information corresponding to an OPU (Optical channel Payload Unit) and overhead information corresponding to an ODU (Optical channel Data Unit) onto the client signal terminated by the client signal processor 12, and further adds the overhead information corresponding to an OTU (Optical channel Transport Unit) k and a forward error correction (FEC) byte onto the client signal to store the client signal in the OTUk frame.

FIGS. 3A and 3B are diagrams illustrating a structure of the OTUk frame.

As illustrated in FIG. 3A, the OTUk frame has 4080 bytes×4 rows. In data strings of the respective rows, an overhead, a payload, and an FEC are arranged in the listed order from the front. For the overhead in the first row, a FAS (Frame Alignment Signal) is stored in the first to sixth bytes, OTUk overhead information (OTUk_OH) is stored in the seventh to fourteenth bytes, and OPU (Optical channel Payload Unit) overhead information (OPU_OH) is stored in the fifteenth and sixteenth bytes. For the overhead in the second and subsequent rows, overhead information (ODUk_OH) of ODU (Optical channel Data Unit) k is stored. For the payload in the respective rows, a client signal is stored.

FIG. 3B is an enlarged view of the first row of the overhead. The FAS has a frame synchronization pattern of OA1 in the first to third bytes and OA2 in the fourth to sixth bytes. In other words, the FAS has the pattern of OA1, OA1, OA1, OA2, OA2, and OA2 in the listed order. For the OA1, a fixed hexadecimal number of "F6" (bit string of "11110110") is set as an FW (Framing Word). For the OA2, a fixed hexadecimal number of "28" (bit string of "00101000") is set as an FW. In other words, the FAS arranged at the front of the data string in the OTUk frame has a fixed pattern of "F6, F6, F6, 28, 28, 28". Moreover, the FAS is allocated in a non-scrambled area where a scramble processing is not performed. In other words, in an area other than the FAS in the OTUk frame, the scramble processing may be performed.

For the OTUk_OH subsequent to the FAS, a MFAS (Multi Frame Alignment Signal) is stored in the seventh byte, SM (Section Monitoring) information is stored in the eighth to tenth bytes, and GCC (General Communication Channel) information is stored in the eleventh and twelfth bytes. Note that the thirteen and fourteenth bytes are RSE (Reserved for future international standardization) and are unused.

Figure 4:
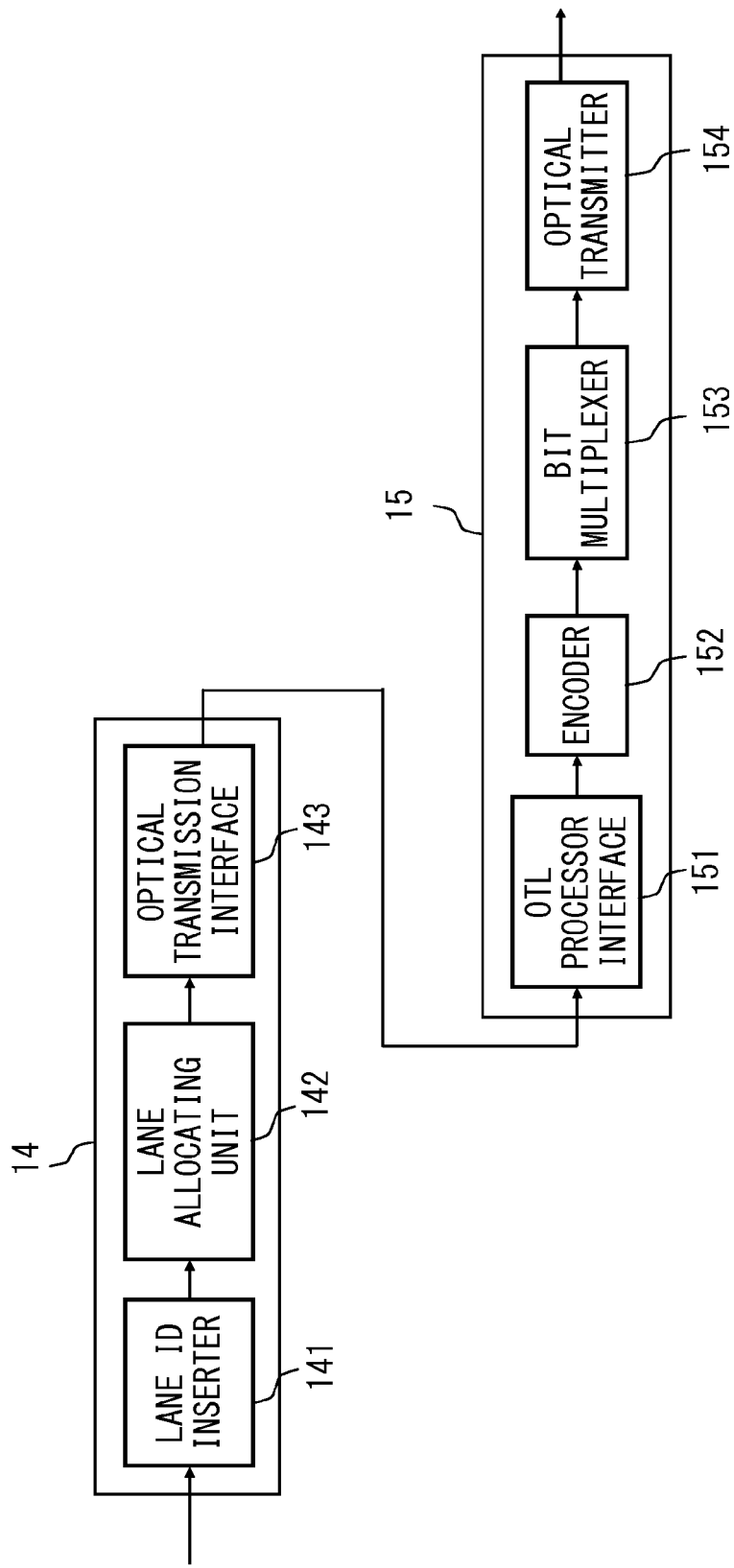
FIG. 4 is a block diagram illustrating an example of the configuration of an OTL processor and an optical transmitter module in a transmitter unit according to the embodiment.

As illustrated, for example, in FIG. 4, the OTL processor 14 (see FIG. 2) includes a lane ID inserter 141, a lane allocating unit 142, and an optical transmission interface 143.

With regard to the OTUk frame output from the OTUk frame processor 13, the lane ID inserter 141 replaces at least one byte in the FAS of the overhead with a lane ID. After the data in an OTUk frame is divided and rearranged by the lane allocating unit 142 in the subsequent stage into a plurality of logical lanes, the lane ID is used to identify a logical lane in which the start of the data string of the OTUk frame is arranged. As described above, when a skew at each logical lane is within a half of the time period corresponding to the frame length of the OTUk frame which is divided by the number of the logical lanes, at least one byte of the FAS corresponding to one of the logical lanes is set to a value different from the bytes of the FAS corresponding to the other remaining logical lanes.

Figure 5A:
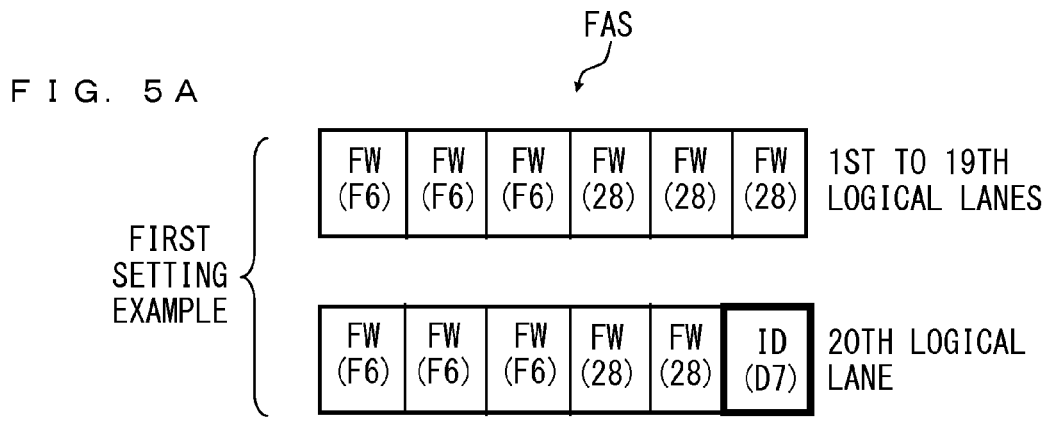
FIGS. 5A-5C are diagrams illustrating an example of an overhead portion to which a lane ID is set.
Figure 5B:
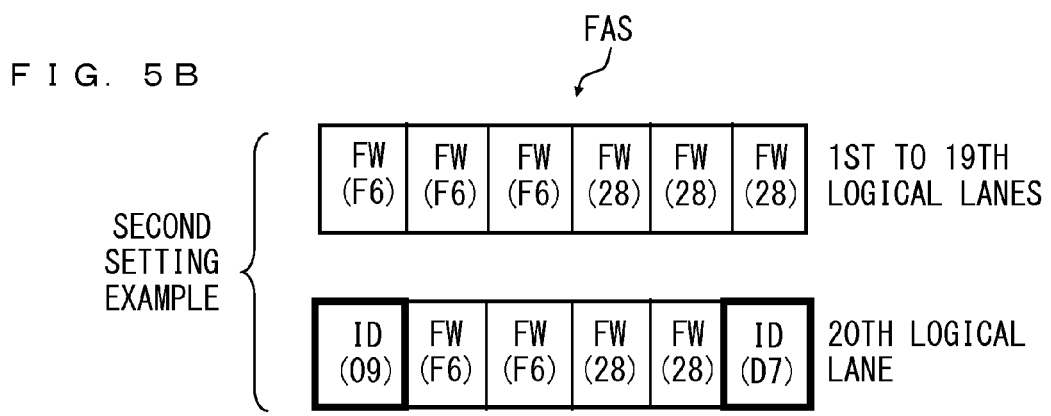
Figure 5C:
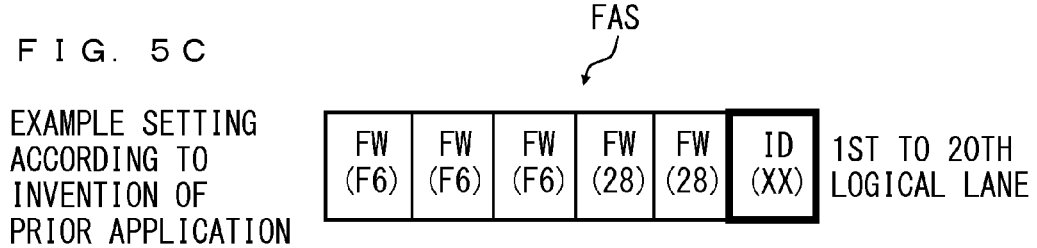

FIGS. 5A-5C are diagrams illustrating an example of a FAS to which a lane ID is set. In the first setting example of FIG. 5A, the FAS corresponding to the first to 19th logical lanes out of the twenty logical lanes is set to a fixed pattern "F6, F6, F6, 28, 28, 28" of the above-mentioned OTU standards. The FAS corresponding to the 20th logical lane is changed to the pattern "F6, F6, F6, 28, 28, D7" by performing a bit inversion on "28" on the sixth byte of the fixed pattern so as to obtain "D7" (a bit string of "11010111").

In the example, the FAS of the 20th logical lane out of the twenty logical lanes is changed into a pattern different from the FAS of the other logical lanes. However, the pattern of the FAS of any one of a plurality of logical lanes may be changed.

In the second setting example of FIG. 5B, the FAS corresponding to the first to 19th logical lanes is also set to a fixed pattern "F6, F6, F6, 28, 28, 28" of the OTU standards. The FAS corresponding to the 20th logical lane is changed to the pattern "09, F6, F6, 28, 28, D7" by performing a bit inversion on "F6" on the first byte of the fixed pattern so as to obtain "09" (bit string of "00001001") and by performing a bit inversion on "28" on the sixth byte so as to obtain "D7". When a bit inversion is performed on two bytes of the fixed pattern of the OTU standards as in the second setting example, it becomes possible to more precisely detect the lane ID according to a majority method which will be described later, compared with the first setting example.

In FIG. 5C, an example of the FAS according to the invention of the prior application is illustrated, where the sixth byte of the fixed pattern of the OTU standards "28" is replaced with a sequence number "XX" which corresponds to the lane number. In such a setting of the FAS, the bit pattern of the FAS corresponding to each of the first to 20th logical lanes continuously changes.

The lane allocating unit 142 illustrated in FIG. 4 divides the OTUk frame where the lane ID is set to the FAS by the lane ID inserter 141 for a specified number of bytes according to an OTL, and rearranges (or allocates) the divided portions of the OTUk frame into a plurality of logical lanes. The data strings rearranged into a plurality of logical lanes by the lane allocating unit 142 are sent to the optical transmitter module 15 via the optical transmission interface 143.

FIG. 6 is a diagram illustrating an example of a method for dividing an OTUk frame of the lane allocating unit 142. In the example of FIG. 6, one frame (1 to 16320 bytes) of the OTUk is divided for every 16 bytes, and is converted into 255 blocks×4 rows. A notation of "1:16" to "16305:16320" in FIG. 6 indicates (position for a start byte): (position for an end byte) in the respective blocks. For example, the data of the first to 16th bytes in the OTUk frame is stored in the top-left block and is notated as "1:16". The example in which the OTUk frame is divided for every 16 bytes has been described above, but the OTUk frame may be divided for any number of bytes as a matter of design choice.

Figure 7:
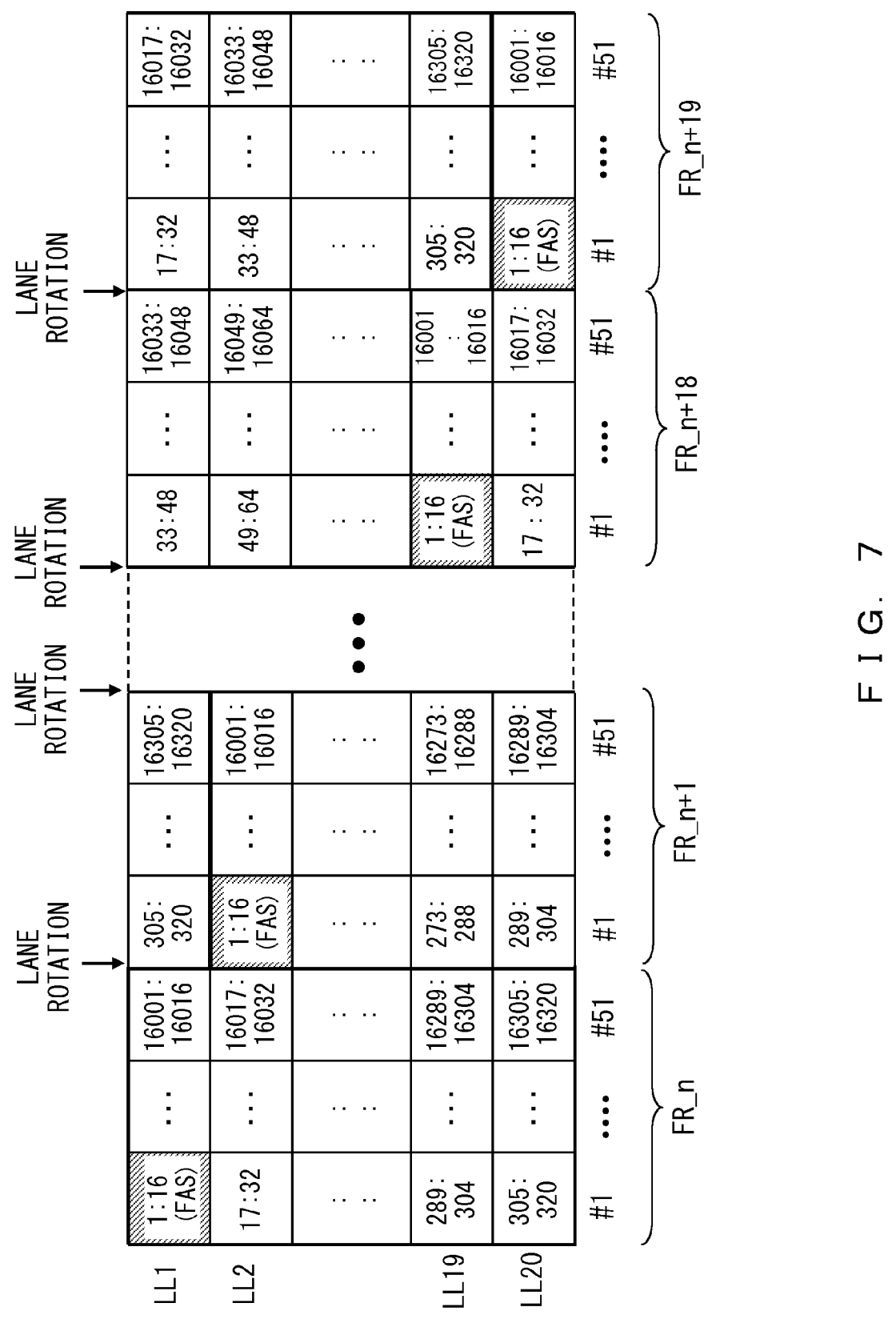

FIG. 7 is a diagram illustrating a method for rearranging the respective blocks of the OTUk frames divided for 16 bytes (FIG. 6) into twenty logical lanes. First, with regard to the OTUk frame FR_n at the n-th position, the "1:16 (FAS)" block is arranged in the first column #1 of the first logical lane LL1, and the following "17:32" block is arranged in the first column #1 of the second logical lane LL2. Then, in a similar manner, the "305:320" block at the 20th block is arranged in the first column #1 of the 20th logical lane LL20. When all the blocks in the first column #1 of the respective logical lanes LL1 to LL20 are filled, the process shifts to the second column, and in a similar manner to the case of the first column #1, the following blocks are arranged in the order from the second column of the first logical lane LL1 to the second column of the 20th logical lane LL20. When the rearrangement of all the blocks in the n-th OTUk frame FR_n has been completed in accordance with the rule above, the last "16305:16320" block is arranged in the 51st column #51 of the 20th logical lane LL20. Through the rearrangement above, the n-th OTUk frame FR_n is converted into the data string composed of 20 logical lines each of which has 51 blocks.

Herein, the OTUk frame has "4080 bytes×4=16320" bytes as illustrated in FIG. 3A. Moreover, as the OTUk frame is divided into blocks each having 16 bytes, the number of blocks for one OTUk frame is 1020, which is obtained by dividing 16320 by 16. In other words, the "16305:16320" block is the 1020-th block. As the number of logical lanes is set to 20, the 1020-th block is arranged in the 51st column.

The description of FIG. 7 continues. With regard to the OTUk frame FR_n+1 at the (n+1)th position, the "1:16 (FAS)" block is arranged in the lane whose lane number is larger by one than that of the lane at which the first block in the immediately previous OTUk frame FR_n is arranged. In other words, the "1:16 (FAS)" block of the OTUk frame FR_n+1 is arranged in the first column #1 of the second logical lane LL2. The subsequent "17:32" block is arranged in the first column #1 of the third logical lane LL3, and then, in a similar manner, the "289:304" block is arranged in the first column #1 of the 20th logical lane LL20. The subsequent "305:320" block is arranged at an unused area in the first column #1 of the first logical lane LL1. When all the blocks in the first column #1 of the respective logical lanes LL1 to LL20 are filled, the process shifts to the second column, and in a similar manner to the case of the first column #1, after the following blocks are arranged in the order from the second column of the second logical lane LL2 to the second column of the 20th logical lane LL20, the block is arranged in the second column of the first logical lane LL1. When all the blocks in the (n+1)th OTUk frame FR_n+1 have been rearranged in accordance with the rule above, the last "16305:16320" block is arranged in the 51st column of the first logical lane LL1.

As described above, when the rearrangement for one OTUk frame has been completed and the rearranging process shifts to the rearrangement for the next OTUk frame, the rearranging process by the lane allocating unit 142 from the OTUk frame into the logical lanes LL1 to LL20 is executed in the order of the frame numbers of the OTUk frames in accordance with the rule where the logical lane in which the "1:16 (FAS)" block (diagonally-shaded block in FIG. 7) is arranged is put forward by one and the logical lane is rotated for every frame. In the example of FIG. 7, the first block in the (n+19)th OTUk frame FR_n+19 is arranged in the first column #1 of the 20th logical lane LL20, and through the rearrangement from the OTUk frame FR_n to the OTUk frame FR_n+19, one round of the lane rotation from the first logical lane LL1 to the 20th logical lane LL20 is completed. Here, in the setting examples of FAS of FIGS. 5A and 5B above, the FAS arranged in the last (that is, 20th) logical lane LL20 out of the FAS arranged in each of the first to 20th logical lanes LL1-LL20, i.e., only the FAS of the OTUk frame FR_n+19, has the FAS of a bit array different from the FAS arranged in the other logical lanes LL1-LL19.

The example in which the data stored in the OTUk frame is rearranged into 20 logical lanes LL1 to LL20 and processed in parallel has been described above, but the total number (parallel number) of the logical lanes may be set to any number depending on the configuration and the operational speed of the signal processing circuit. If the total number of the logical lanes is increased, it is possible to perform the signal processing by using a circuit whose operation speed is relatively low. On the other hand, if the total number of the logical lanes is decreased, the circuit may be simplified. For example, a system compatible with the OTU3 is regulated to rearrange the OTUk frame into four logical lanes. Optical signals are transmitted at 40 Gbps in the OTU3, and thus the operation speed per logical lane is about 10 Gbps. In a similar manner, optical signals are transmitted at 100 Gbps in the OTU4 in cases where the OTUk frame is rearranged into four logical lanes in a system compatible with the OTU4, and thus the operation speed per logical lane is larger than or equal to 25 Gbps. It is difficult to prepare such a high-speed circuit at present, and thus it is more effective to increase the number of the logical lanes to limit the operation speed per logical lane.

In relation to the above-mentioned system compatible with the OTU3, when the OTUk frame is rearranged into four logical lanes, it is possible to detect in what logical lane out of the four logical lanes the start of the data string in the OTUk frame is arranged by using the two lower-order bits of the MFAS (see FIG. 3) contained in the overhead information of the OTUk frame. In other words, the two lower-order bits of the existing MFAS may be utilized instead of the above-mentioned lane ID. However, the use of the two lower-order bits of the MFAS is limited to the case where the number of the logical lanes is four, and thus it is not possible to limit the operation speed per logical lane as above by increasing the total number of the logical lanes. A method for replacing a part of the FAS for the lane ID which is adopted in the present embodiment has an advantage wherein it is possible to deal with any number of logical lanes, and is very effective at dealing with the optical signal at an higher speed. Under circumstances where a bit error occurs at a relatively high probability due to the increasing speed of an optical signal, it is particularly advantageous if the configuration and method of the present embodiment is applied.

As illustrated in FIG. 4, the optical transmitter module 15 (FIG. 2) includes, for example, an OTL processor interface 151, an encoder 152, a bit multiplexer 153, and an optical transmitter 154.

The data strings in the respective logical lanes LL1 to LL20 output from the OTL processor 14 are fed to the encoder 152 via the OTL processor interface 151, and the encoder 152 performs a necessary encoding process on the data strings according to the multi-level modulation of the optical signals to be transmitted to the transmission line 2. In cases where the transmission data need to be scrambled, the encoder 152 may scramble the data strings in an any area excepting the FAS by using a specified scramble code.

The bit multiplexer 153 multiplexes the above-mentioned data strings in the respective logical lanes LL1 to LL20 processed by the encoder 152 according to the multi-level modulation for the optical signals transmitted to the transmission line 2. For example, if the above-mentioned multi-level modulation for the optical signals is DP-QPSK (Dual Polarization-Quadrature Phase Shift Keying) in which a phase modulation of 2 bits (4 values) and a polarization multiplex are combined, an In-phase (I) component and a Quadrature-phase (Q) component in the 4-level phase modulation are respectively transmitted by an X-polarization and a Y-polarization. For this reason, the bit multiplexer 153 multiplexes the data strings of the respective logical lanes LL1 to LL20 into four types of data strings to generate a data signal X_I corresponding to the I component of the X-polarization, a data signal X_Q corresponding to the Q component of the X-polarization, a data signal Y_I corresponding to the I component of the Y-polarization, and a data signal Y_Q corresponding to the Q component of the Y-polarization.

FIG. 8 is a diagram illustrating an example of a method for multiplexing the data strings of the logical lanes LL1-LL20 into four types of data string. In the example of FIG. 8, the data strings of the logical lanes LL1 to LL5 are multiplexed to generate the data signal X_I corresponding to the I component of the X-polarization, and the data strings of the logical lanes LL6 to LL10 are multiplexed to generate the data signal X_Q corresponding to the Q component of the X-polarization. Moreover, the data strings of the logical lanes LL11 to LL15 are multiplexed to generate the data signal Y_I corresponding to the I component of the Y-polarization, and the data strings of the logical lanes LL16 to LL20 are multiplexed to generate the data signal Y_Q corresponding to the Q component of the Y-polarization. Such a multiplexing scheme corresponds to OTL4.4, which is described by ITU-T.

FIG. 9 is a diagram illustrating another example of a method for multiplexing the data string of the logical lanes LL1-LL20 into four types of data string. In the example of FIG. 9, two adjacent logical lanes of the twenty logical lanes LL1 to LL20 are multiplexed. Then, ten data strings of the logical lanes are classified into four types of the data strings from the front, thereby generating data signals respectively corresponding to the I and Q components of the X-polarization and the I and Q components of the Y-polarization. Such a two-stage multiplexing scheme corresponds to bit multiplexing in a GearBox described by IEEE (The Institute of Electrical and Electronics Engineers, Inc.) 100 GbE. Note that a method for multiplexing logical lanes is not limited to the examples of FIGS. 8 and 9, and any multiplexing method corresponding to an applied multi-level modulation may be adopted.

The optical transmitter 154 (see FIG. 4) generates the optical signal of the multi-level modulation by using the data signals output from the bit multiplexer 153, and transmits the optical signal to the transmission line 2.

Figure 10:
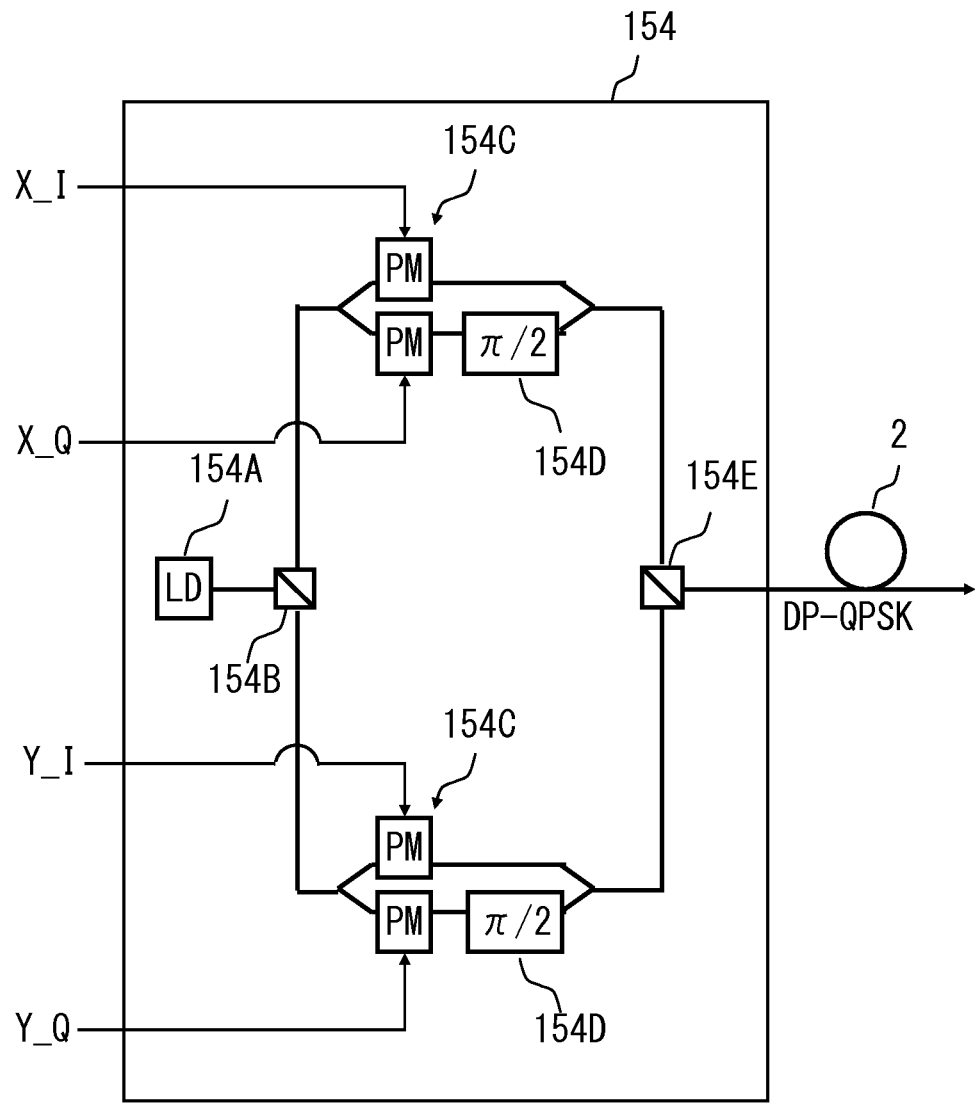
FIG. 10 is a block diagram illustrating an example of the configuration of an optical transmitter for DP-QPSK according to the embodiment.

FIG. 10 is a block diagram illustrating an example of the configuration of the optical transmitter 154 corresponding to the DP-QPSK. In the example of the configuration of FIG. 10, the optical transmitter 154 includes a light source (LD) 154A, a polarization separator 154B, four phase modulators (PM) 154C, two phase shifters 154D, and a polarization combiner 154E. In the optical transmitter 154, the light output from the light source 154A is separated into orthogonal polarization components by the polarization separator 154B, and the respective lights of the X-polarization and the Y-polarization are further branched into two to be respectively provided to the four phase modulators 154C. The lights input to the phase modulators 154C are subjected to phase modulation in accordance with the respective data signals X_I, X_Q, Y_I, and Y_Q output from the bit multiplexer 153. After the phase of one of a pair of the lights corresponding to the respective polarizations is shifted by π/2 by the phase shifter 154D, the light subjected to the phase modulation by the respective phase modulators 154C is combined with the other one of the lights, and further, the lights of the respective polarizations are combined by the polarization combiner 154E. Accordingly, the DP-QPSK optical signal is transmitted from the optical transmitter 154 to the transmission line 2.

The case of the DP-QPSK has been described above as an example of the configuration of the optical transmitter 154, but the configuration of the optical transmitter 154 is not limited to the above-described case, and a known configuration corresponding to the multi-level modulation for the optical signal to be transmitted to the transmission line 2 may be applied thereto.

The receiver unit 1B (see FIG. 2) includes, for example, an optical receiver module 21, an OTL processor 22 functioning as a frame recovery, an OTUk frame processor 23, a client signal processor 24, and a plurality of client signal transmitters 25.

Figure 11:
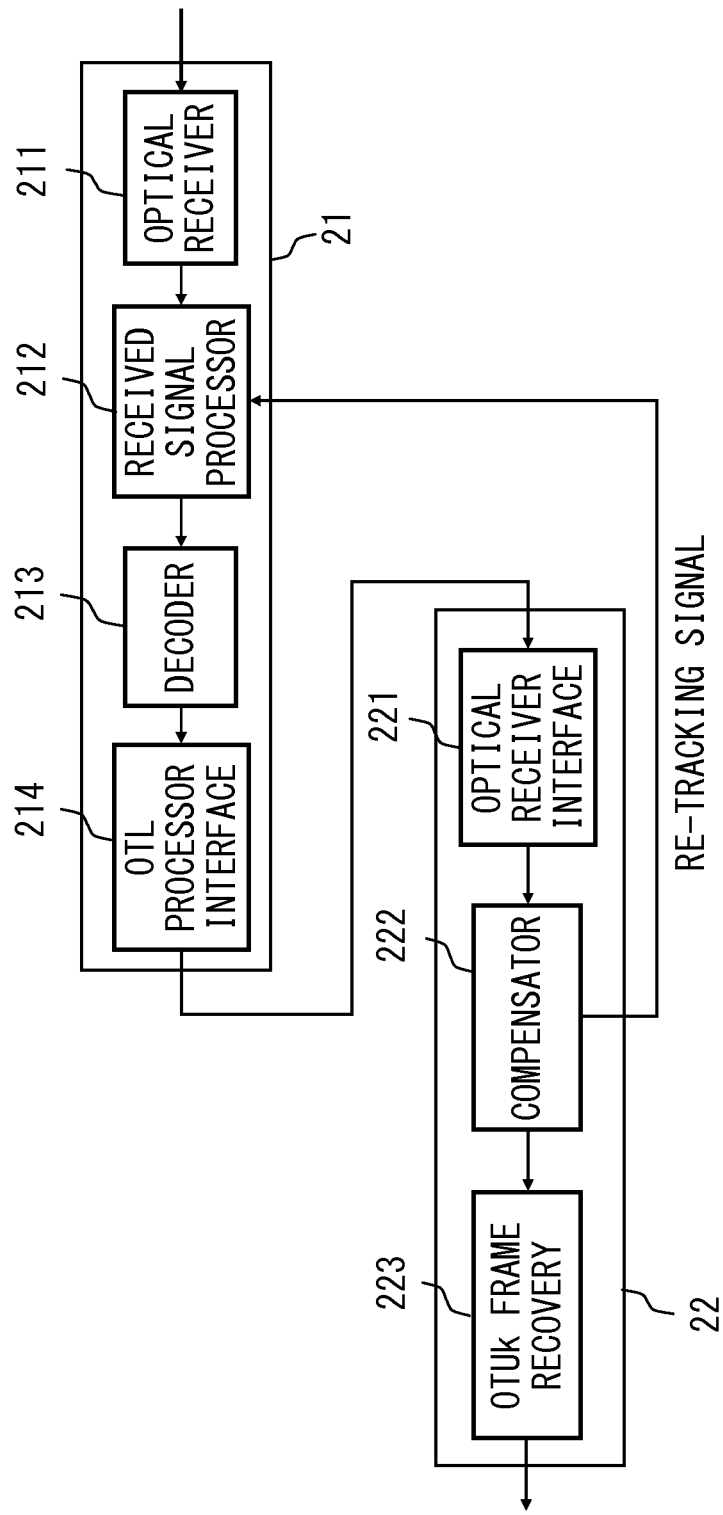
FIG. 11 is a block diagram illustrating an example of the configuration of an optical receiver module and an OTL processor in a receiver unit according to the embodiment.

As illustrated in FIG. 11, the optical receiver module 21 includes, for example, an optical receiver 211, a received signal processor 212, a decoder 213, and an OTL processor interface 214.

The optical receiver 211 receives the optical signal transmitted through the transmission line 2 and converts the optical signal into an electric signal to output the converted signal to the received signal processor 212.

FIG. 12 is a block diagram illustrating an example of a configuration of the optical receiver 211 which is compatible with the DP-QPSK. In the example of the configuration in FIG. 12, the optical receiver 211 includes a local oscillator light source (LD) 211A, a 90-degree hybrid circuit 211B, and four photo detectors (PD) 211C. In the optical receiver 211, the optical signal from the transmission line 2 and the local oscillation light output from the local oscillator light source 211A are provided to the 90-degree hybrid circuit 211B, and the respective output lights from the 90-degree hybrid circuit 211B are converted into electric signals by the respective photo detectors 211C and sent to the received signal processor 212.

The received signal processor 212 (see FIG. 11) processes the output signals from the optical receiver 211 to detect the data corresponding to the I and Q components of the X-polarization and the Y-polarization of the received optical signal.

Figure 13:
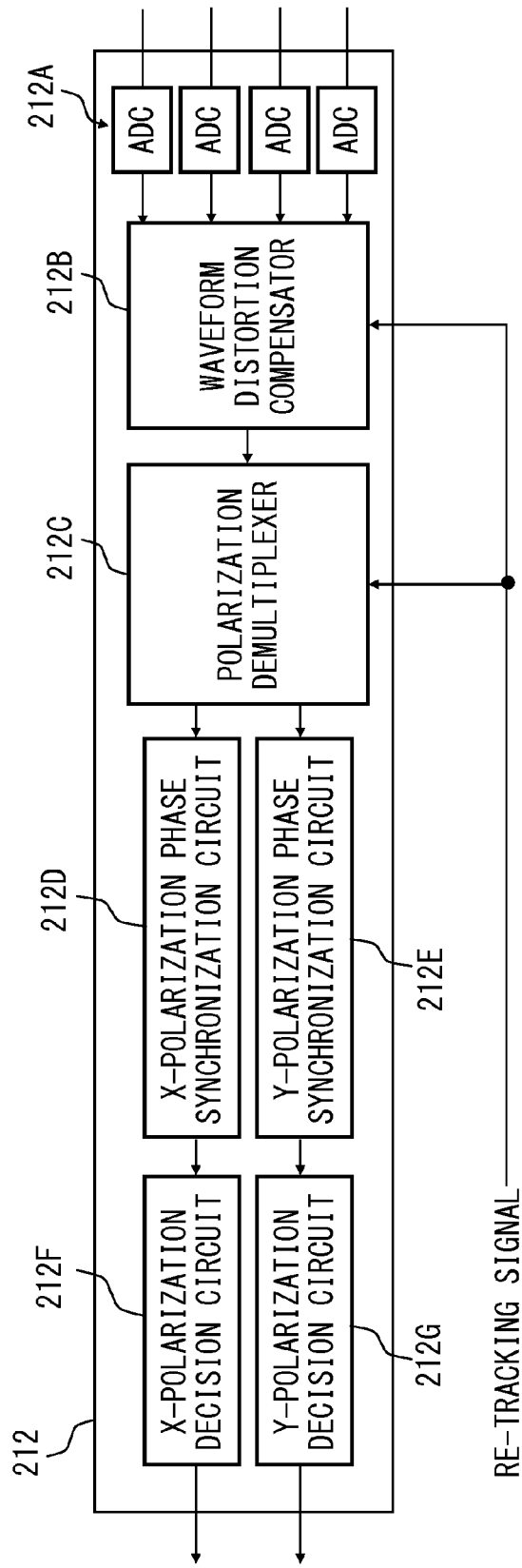
FIG. 13 is a block diagram illustrating an example of the configuration of a received signal processor for DP-QPSK according to the embodiment.

FIG. 13 is a functional block diagram illustrating an example of the configuration of the received signal processor 212, which is compatible with the DP-QPSK. In the example of the configuration of FIG. 13, the received signal processor 212 includes four A/D converters (ADC) 212A, a waveform distortion compensator 212B, a polarization demultiplexer 212C, an X-polarization phase synchronization circuit 212D, a Y-polarization phase synchronization circuit 212E, an X-polarization decision circuit 212F, and a Y-polarization decision circuit 212G.

In the received signal processor 212, the respective output signals from the optical receiver 211 are AD-converted by the AD converters 212A, and then the converted signals are sequentially provided to the waveform distortion compensator 212B and the polarization demultiplexer 212C. Through signal processing in which a required digital filter or the like is used, the waveform distortion of the received signal caused due to the chromatic dispersion, the polarization mode dispersion (PMD), a nonlinear effect, or the like in the transmission line 2 is compensated for, and the components corresponding to the X-polarization and the Y-polarization of the relevant received signal are demultiplexed. The digital signal processing in the waveform distortion compensator 212B and the polarization demultiplexer 212C uses a re-tracking signal from the OTL processor 22 that will be described later and changing the setting or the like of coefficients of the digital filter. Then, the I and Q components of the X-polarization and the I and Q components of the Y-polarization are synchronized by the phase synchronization circuits 212D and 212E for the X-polarization and the Y-polarization, and the decision circuits 212F and 212G for the X-polarization and the Y-polarization detect the data that corresponds to the respective components. The received data indicating the detection results in the decision circuits 212F and 212G is sent to the decoder 213 of FIG. 11.

The decoder 213 uses the respective pieces of received data of the X-polarization and the Y-polarization output from the received signal processor 212 to perform a decoding process corresponding to the DP-QPSK, such that the data strings respectively corresponding to the respective I and Q components of the X-polarization and the Y-polarization of the received optical signal will be generated. Moreover, the decoder 213 rearranges the decoded four data strings into data strings that correspond to the first to 20th physical lanes PL1-PL20, the number of which is the same as that of the logical lanes at the transmitting end. The physical lanes PL1 to PL20 are physical lanes determined by the circuit configuration of the decoder 213. The above-mentioned data strings of the physical lanes PL1 to PL20 are output to the OTL processor 22 via the OTL processor interface 214.

As described above, in the optical transmission system in which the multi-level modulation is adopted, the inversion and swapping of bits may occur in one symbol time period depending on the operating environment of the system, and the state of the signal decoded at the receiving end may be different from that of the originally transmitted signal. For this reason, the above-mentioned data strings of the physical lanes PL1 to PL20 output from the optical receiver 21 to the OTL processor 22 do not always match the data strings of the originally transmitted logical lanes LL1 to LL20. This situation will be described in detail on the assumption that the optical signal of the DP-QPSK would be transmitted in a similar manner to the above-described example.

Figure 14A:
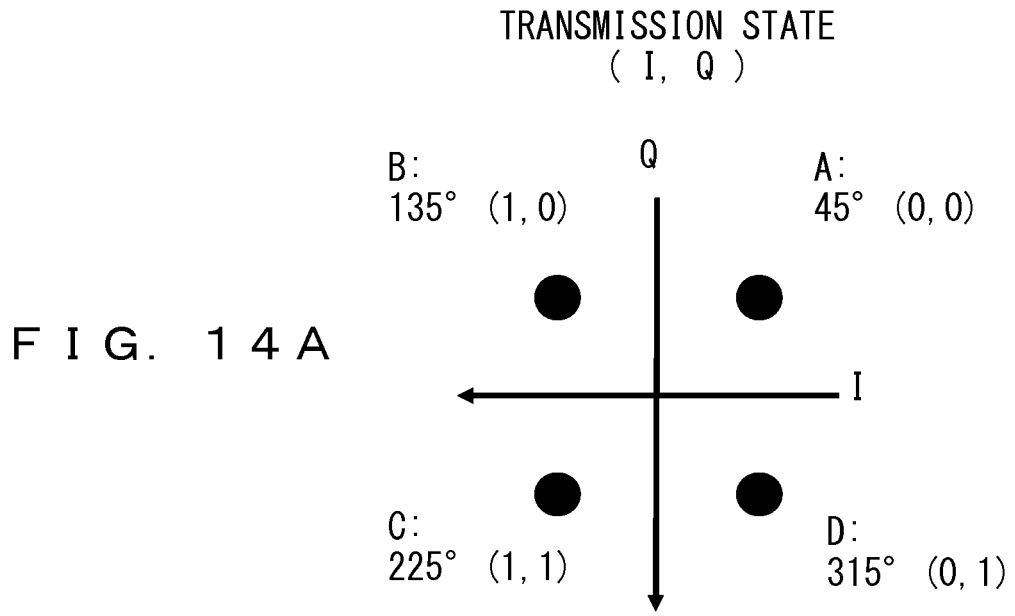
FIGS. 14A and 14B are diagrams illustrating examples of a transmission state and a normal reception state of an optical signal in DP-QPSK.
Figure 14B:
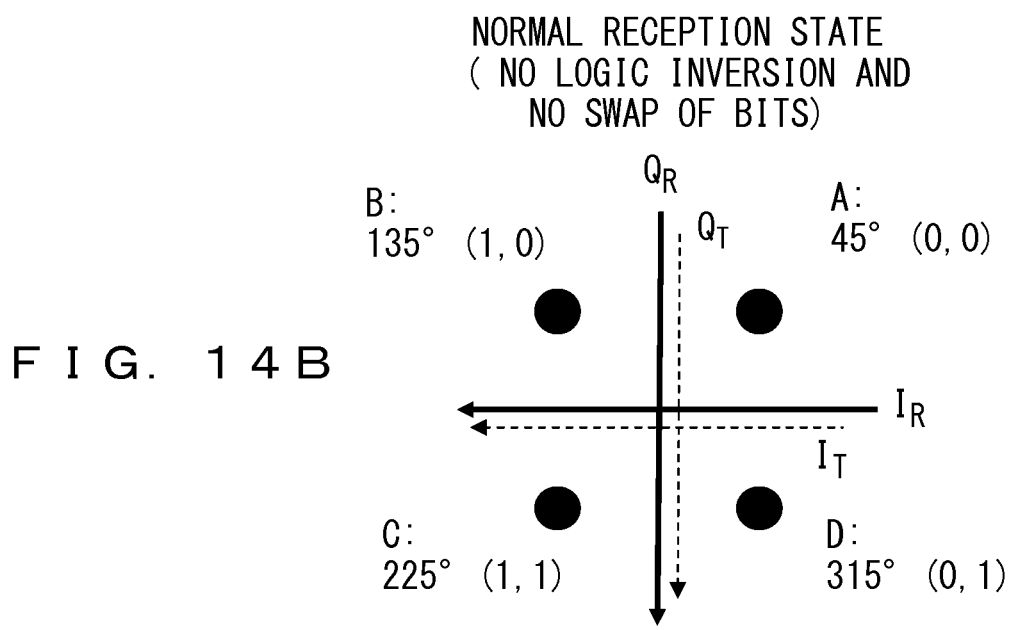

FIGS. 14A and 14B are diagrams illustrating an example of the transmission state of the optical signal of the DP-QPSK in one symbol and the reception state of a case in which the relevant optical signal is normally transmitted without the logic inversion and swapping of bits. In a transmission state of FIG. 14A, the X-polarization (or the Y-polarization) of the optical signal is in four states A to D depending on the phases of the I and Q components. The state A corresponds to an orientation of 45 degrees with respect to an axis I represented by a solid-line arrow in FIG. 14A, where the phases of the I and Q components are given as 0. The state B corresponds to an orientation of 135 degrees, where the phase of the I component is given as 1 and the phase of the Q component is given as 0. The state C corresponds to an orientation of 225 degrees, where the phases of the I and Q components are both given as 1. The state D corresponds to an orientation of 315 degrees, where the phase of the I component is given as 0 and the phase of the Q component is given as 1. In a normal reception state of FIG. 14B, the relationship between an axis $I_R$ and an axis $Q_R$ at the time of the reception represented by the solid-line arrows match the relationship between an axis $I_T$ and an axis $Q_T$ at the time of the transmission represented by the broken-line arrows, and the four states A to D at the time of the reception and the transmission become the same.

Figure 15A:
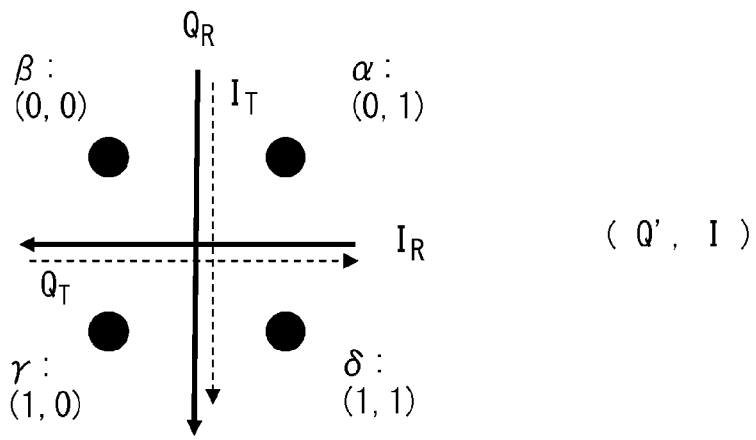
FIGS. 15A-15C are diagrams illustrating examples of reception states in cases where inversion and swapping of bits occur to the optical signal in DP-QPSK.
Figure 15B:
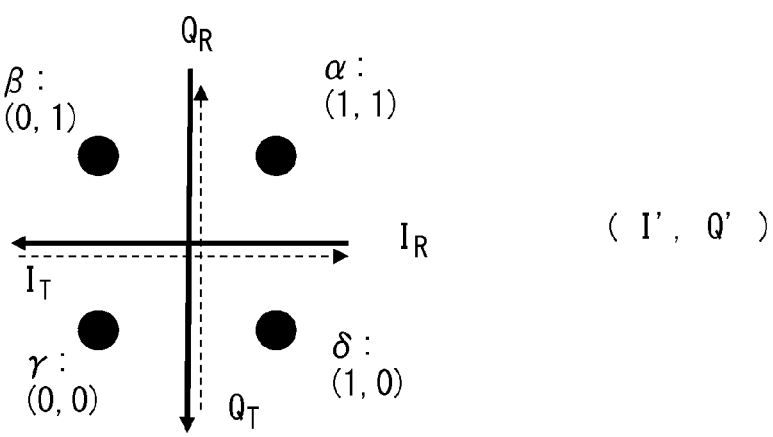
Figure 15C:
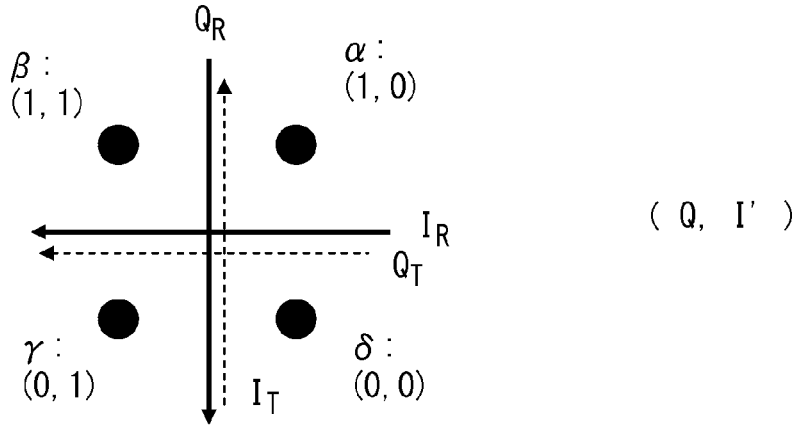

FIGS. 15A-15C are diagrams illustrating an example of the reception state of a case in which the inversion and swapping of bits have occurred. In the reception state of FIG. 15A, the axis $I_T$ and the axis $Q_T$ at the time of the transmission are rotated anti-clockwise by 90 degrees with respect to the axis $I_R$ and the axis $Q_R$ at the time of the reception. In other words, the axis $I_T$ and the axis $Q_T$ at the time of the transmission are swapped, and also the orientation of the axis $Q_T$ is inverted. For this reason, the four states α to δ at the time of the reception are different from the four states A to D at the time of the transmission. If the data corresponding to the I and Q components at the time of the transmission is represented with (I, Q), the decoded state at the time of the reception becomes (Q', I). Note that Q' represents a value in which Q is subjected to the logic inversion, and hereinafter, the values of the logic inversion will be represented in a similar manner.

In the reception state of FIG. 15B, the axis $I_T$ and the axis $Q_T$ at the time of the transmission are rotated anti-clockwise by 180 degrees with respect to the axis $I_R$ and the axis $Q_R$ at the time of the reception. In other words, the orientations of the axis $I_T$ and the axis $Q_T$ at the time of the transmission are both inverted. For this reason, the four states α to δ at the time of the reception are different from the four states A to D at the time of the transmission, and the decoded state at the time of the reception becomes (I', Q'). Moreover, in the reception state of FIG. 15C, the axis $I_T$ and the axis $Q_T$ at the time of the transmission are rotated anti-clockwise by 270 degrees with respect to the axis $I_R$ and the axis $Q_R$ at the time of the reception. In other words, the axis $I_T$ and the axis $Q_T$ at the time of the transmission are swapped, and also the orientation of the axis $I_T$ is inverted.

For this reason, the four states α to δ at the time of the reception are different from the four states A to D at the time of the transmission, and the decoded state at the time of the reception becomes (Q, I').

The above-described changes in the reception state occur due to the bias points of the phase modulator 154C in the optical transmitter 154, the length difference in the optical path between the polarization separator 154B and the polarization combiner 154E, the polarization mode dispersion (PMD) and the non-linear phase noise in the transmission line 2, the length difference in the inter-polarization optical path in the optical receiver 211, the phase fluctuations of the local oscillator light source 211A, or due to the swapping of the polarization channels (of the X-polarization, the Y-polarization) at the time of the reception. FIG. 16 is a diagram illustrating the combinations of reception states that may occur at the time of transmitting the optical signal of the DP-QPSK. As described above, it is considered that there are 32 reception states for the respective I and Q components of the X-polarization and the Y-polarization due to the inversion and swapping of bits.

As illustrated in FIG. 11, the OTL processor 22 (see FIG. 2) includes, for example, an optical receiver interface 221, a compensator 222, and an OTUk frame recovery 223. The data strings of the physical lanes PL1 to PL20 output from the optical receiver module 21 are provided to the compensator 222 via the optical receiver interface 221.

The compensator 222 detects a FAS for the data strings of the physical lanes PL1 to PL20 and detects a lane ID contained in the FAS according to a majority method, and detects the inversion of bits and the swapping of lanes based on the detection result to compensate for the detected inversion of bits and the swapping of lanes. FIG. 17 is a block diagram illustrating an example of a circuit configuration of the compensator 222.

In FIG. 17, the compensator 222 includes a logic inverter 222A, a FAS detector 222B, and a lane ID detector 222C for each of the data strings of the physical lanes PL1 to PL20.

The logic inverter 222A perform logic inversion on the data string of the corresponding physical lane to output the logic-inverted data string to the FAS detector 222B.

The data string of the corresponding physical lane and the data string subjected to the logic inversion by the logic inverter 222A are input to the FAS detectors 222B, and the FAS detectors 222B detect the FAS for each of the data strings. The FAS detectors 222B provide the detection results of the FAS to a FAS timing detector 222D, and also output the data string in which a FAS is detected out of the input non-inverted or inverted data strings to the lane ID detector 222C.

The lane ID detectors 222C detect the lane ID assigned to a FAS from the data string output from the corresponding FAS detector 222B according to a majority method. The lane ID detectors 222C provide a result of detection of the lane ID to a lane allocation detector 222E, and output to the matrix switch 222F the data string on which a detection of the lane ID is performed.

The FAS timing detector 222D detects a relative relationship of the timing at which the FAS appears among the data signals that correspond to the physical lanes PL1-PL20 according to a result of the detection of the FAS by the FAS detectors 222B, and provide the detection result to the lane allocation detector 222E.

Based on the detection results of the lane ID by the lane ID detectors 222C and the detection results by the FAS timing detector 222D, the lane allocation detector 222E creates a table of the physical lanes and the logical lanes which will be described later, and detects the physical lane in which the swap is occurring in the order of the logical lanes at the time of the transmission to generate a control signal for switching the logical lanes in the matrix switch 222F such that the swap will be compensated for.

The matrix switch 222F includes input ports corresponding to the number of the physical lanes (herein, 20 lanes) and the same number of output ports as the input ports, and the connection states among the input ports and output ports are switched in accordance with the control signal from the lane allocation detector 222E.

The OTUk frame recovery 223 (see FIG. 11) rearranges the data strings of the logical lanes LL1 to LL20 in which the inversion of bits and the swapping of lanes are compensated for and which are output from the compensator 222, for every 16 bytes in an opposite manner to the OTL processing at the transmitting end, and restores the bytes of the FAS which has been swapped for the lane ID so as to reproduce the OTUk frame. The OTUk frame recovered by the OTUk frame recovery 223 is output to the OTUk frame processor 23 (see FIG. 2), and after the error correction process is performed by using the FEC byte that is stored in the FEC portion of the OTUk frame, a client signal is generated in accordance with the overhead information of the OTUk frame. The client signal is transmitted to the corresponding client apparatus CL via the client signal processor 24 and the client signal transmitter 25.

Here, an example of the process performed in the compensator 222 will be described in detail with reference to the flowchart of FIG. 18.

Figure 18:
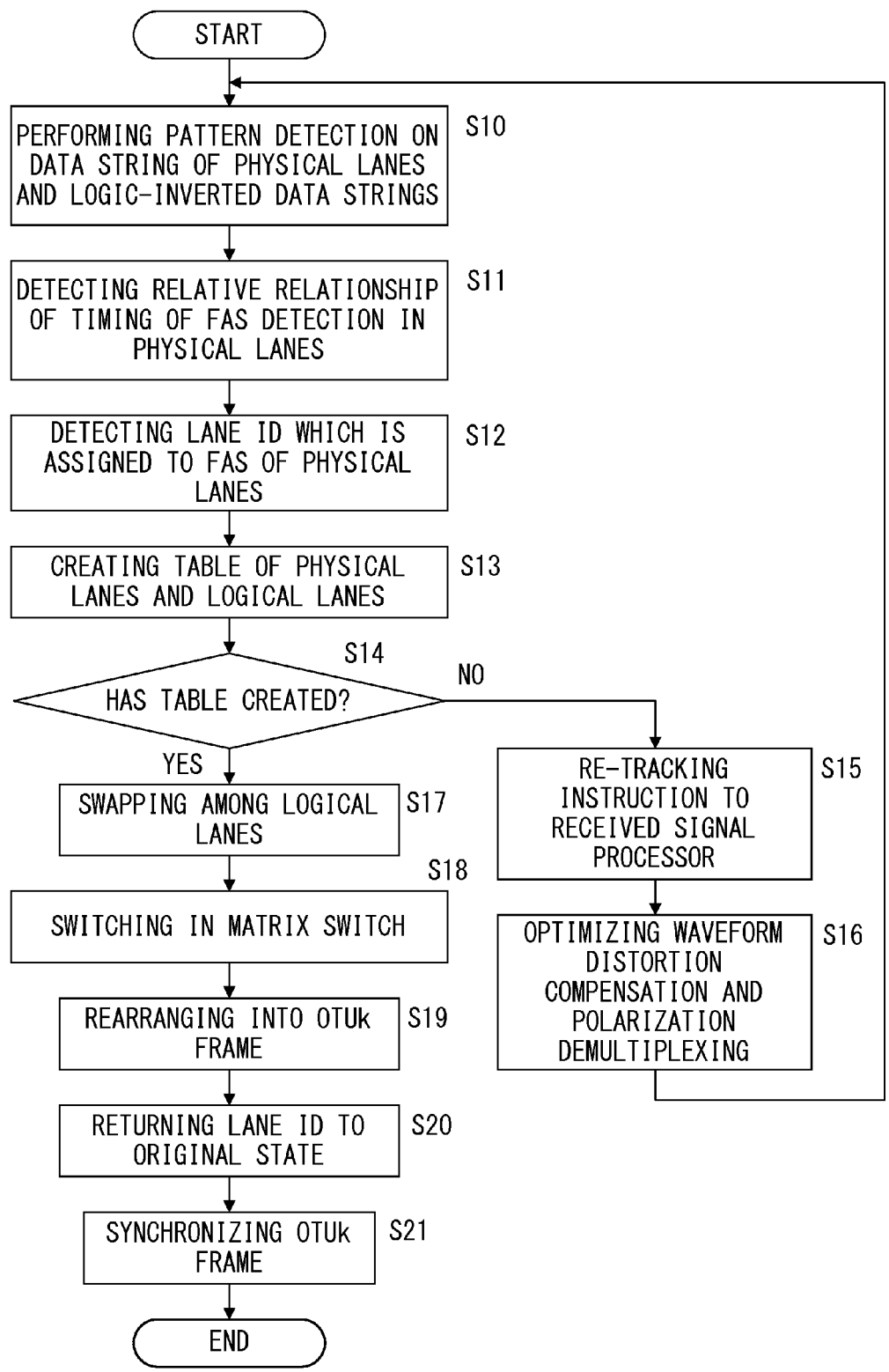
FIG. 18 is a flowchart illustrating an example of processing in a compensator according to the embodiment.

When the data strings of the physical lanes PL1 to PL20 are provided to the compensator 222 at the time of start-up of the system or in a required processing cycle in operation, a FAS detection process is started by the FAS detectors 222B corresponding to the physical lanes PL1 to PL20 (S10 of FIG. 18).

In the FAS detection process at each of the FAS detectors 222B, a pattern detection is performed on the data strings of the physical lanes and the data string which is logic-inverted by the logic inverter 222A, where the bytes other than the lane IDs in the bit array of the FAS of FIG. 5A or FIG. 5B are used for the pattern detection. When a FAS is detected in one of the data strings which is not logic-inverted by the logic inverter 222A and the logic-inverted data string, the detection result is provided to the FAS timing detector 222D. At this time, the data string in which the FAS is detected out of the above-mentioned two types of data strings is selectively output to the lane ID detector 222C. Accordingly, the inversion of bits occurring to the received data due to the operating environment of the system is compensated for.

In the FAS detection process at the FAS detectors 222B, it is assumed that an error is added to the optical signal which is received at the receiver unit 1B through the transmission line, and the received data on which error correction is not yet performed is provided to the FAS detectors 222B. For this reason, it is preferred that the number of matches or mismatches with an expected bit array in the result of the FAS detection be counted, and the appearance of the FAS in a cycle of 4080×4 bytes, i.e., the establishment of frame synchronization in each data string of the physical lanes, is detected by using a technique in which forward and backward protection steps are provided.

The value of the protection step is set such that an expected value with which the FAS is appropriately detected satisfies desired conditions, where the bit error rate (BER) assumed in the optical transmission system is the upper limit. Generally, it is desired that an expected value for establishing a frame synchronization be sufficiently close to one per single frame time, and it is also desired that an average time for the synchronization loss be ten to twenty years or more. Moreover, in view of the system management, it is preferred that the value of a protection step be small that the time required to shift to the facilitation of a main signal and the recovery state as well as the variation will be small. Normally, the number of backward protection steps for synchronization establishment is set to two, and the number of forward protection steps for synchronization loss is set to 10 or less. It is rational to define the upper limit for the BER assumed in the optical transmission system in accordance with the performance of error correction, which is one of the functions defined in the OTN, and the upper limit is BER≈2×10⁻⁴ in a standard RS-FEC of the G.709 standards. In an optical transmission system of even higher speed such as 100 Gbps, high-performance error correction different from the 709 standards may be used. In that case, it is assumed that the upper limit for the BER is up to BER≈10⁻².

At the FAS timing detector 222D, the relative relationship of the timing at which the FAS appears in the physical lanes is detected according to a result of the FAS detection by the FAS detectors 222B (S11 in FIG. 18). Regarding the timing at which the FAS appears among a plurality of logical lanes, as illustrated in FIG. 19A, in an optimal state where there is no skew, the FAS sequentially appears at specified time intervals TI among the mutually adjacent logical lanes LLx, LLy, and LLz. The time interval TI is obtained by dividing the frame length (4080×4 bytes) of the OTUk frame by the number of lanes. In the system according to the present embodiment, as illustrated in FIG. 19B, a skew within a half of the time interval TI is allowable (for example, when TI=125 μs, skew is equal to or less than 62.5 μs). Accordingly, the FAS of the logical lanes sequentially appears at time intervals where the skew is taken into consideration as an error. If the relationship described above is used, it is possible to determine the order of the physical lanes corresponding to the order of the logical lanes according to the relative relationship of the timing at which the FAS appears in the data signals corresponding to the physical lanes. For this reason, the FAS timing detector 222D detects the relative relationship of the timing at which the FAS is detected by the FAS detectors 222B, and a signal representing the detection result is output to the lane allocation detector 222E.

Subsequent to the FAS detection at the FAS detectors 222B and the timing detection at the FAS timing detector 222D, the lane ID detectors 222C detect the lane ID that is assigned to a specified position of each FAS (S12 in FIG. 18). In a similar manner to the above-described case of the FAS detector 222B, the received data on which error correction has not yet been performed is provided to the lane ID detectors 222C. Accordingly, it is possible to adopt a technique in which the number of matches or mismatches with an expected bit array is counted for the bit array of the lane IDs detected from a specified position of the FAS, and a technique in which forward and backward protection steps are provided.

For example, if the relationship between an expected value and a protection step for the detection of the lane ID is calculated, the probability of an occurrence of an error of one or more bits in the lane ID with an N number of bits is $r=1-(1-BER)^N$. When the backward protection step is M1, there is a probability p of $p=(1-r)^{M1}$ that the lane ID is appropriately obtained. When the forward protection step is M2, the frame length is L bits, and the signal speed at the physical lanes is S bits/s, the average hold time T is $T=\{(1-r)^{M2}/(1-r)r^{M2}\}\cdot(L/S)$.

In the substitution of the above-described relationship for specific values, when BER=2×10⁻⁴ under the conditions that, for example, N=8 [bits], L=130560 [bits], S=111.8/20×10⁹ [bps], and M1=2, there is probability of p=0.997 that the lane ID is appropriately obtained. In this case, the average hold time is T=71 years if M2=5. Further, if BER=10⁻² under the same conditions, there is probability of p=0.851 that the lane ID is appropriately obtained. In this case, the average hold time is T=18 years if M2=12.

The above-described calculation result indicates that the probability in which the lane ID is accurately obtained is significantly reduced in the case of BER=10⁻², where a bit error occurs at a relatively high probability. It is also indicated that the forward protection step M2 should be set to a relatively large value when BER=10⁻², and that the time required to be shifted to the facilitation of a main signal and the recovery state as well as the variation is affected.

However, in the present embodiment, a skew is under a specified condition and it is configured such that only a value of the lane ID corresponding to one of the logical lanes is different from the values of the lane IDs corresponding to the other remaining logical lanes, and it is thus possible to apply a majority method to the processing by the lane ID detectors 222C. In other words, as the lane ID detectors 222C decide whether a bit array of at least one byte assigned to the lane ID of the six bytes of the FAS matches the bit array of the corresponding byte in the fixed pattern of the OTU standards according to a majority method, it is possible to detect one lane ID having a single bit array which is different from the other lane IDs corresponding to the respective physical lanes.

Here, the probability in which the lane ID is obtained and the hold time in cases where the lane ID is detected according to a majority method will be described. In the majority method, the probability r' in which the lane ID is erroneously detected is indicated in the following math formula.

$$r' = 1 - \sum_{i=0}^{n} {}_{2n+1}C_n(1-BER)^{2n+1-n}BER^n$$

When the backward protection step is M1, there is a probability p of $p=(1-r')^{M1}$ that the lane ID is appropriately obtained. When the forward protection step is M2, the frame length is L bits, and the signal speed at the physical lanes is S bits/s, the average hold time T' is $T'=\{(1-r')^{M2}/(1-r')r'^{M2}\}\cdot(L/S)$.

In the substitution of the above-described relationship for specific values, when $BER=2\times10^{-4}$ under the conditions that, for example, n=3 when the lane ID is one byte, L=130560 [bits], and $S=111.8/20\times10^9$[bps], there is a probability of p'=1.000 that the lane ID is appropriately obtained. In this case, the average hold time T' is much longer than 20 years if M2=2. Further, if $BER=10^{-2}$ under the same conditions, there is a probability of p'=1.000 that the lane ID is appropriately obtained. In this case, the average hold time T' is much longer than 20 years if M2=3.

Figure 20:
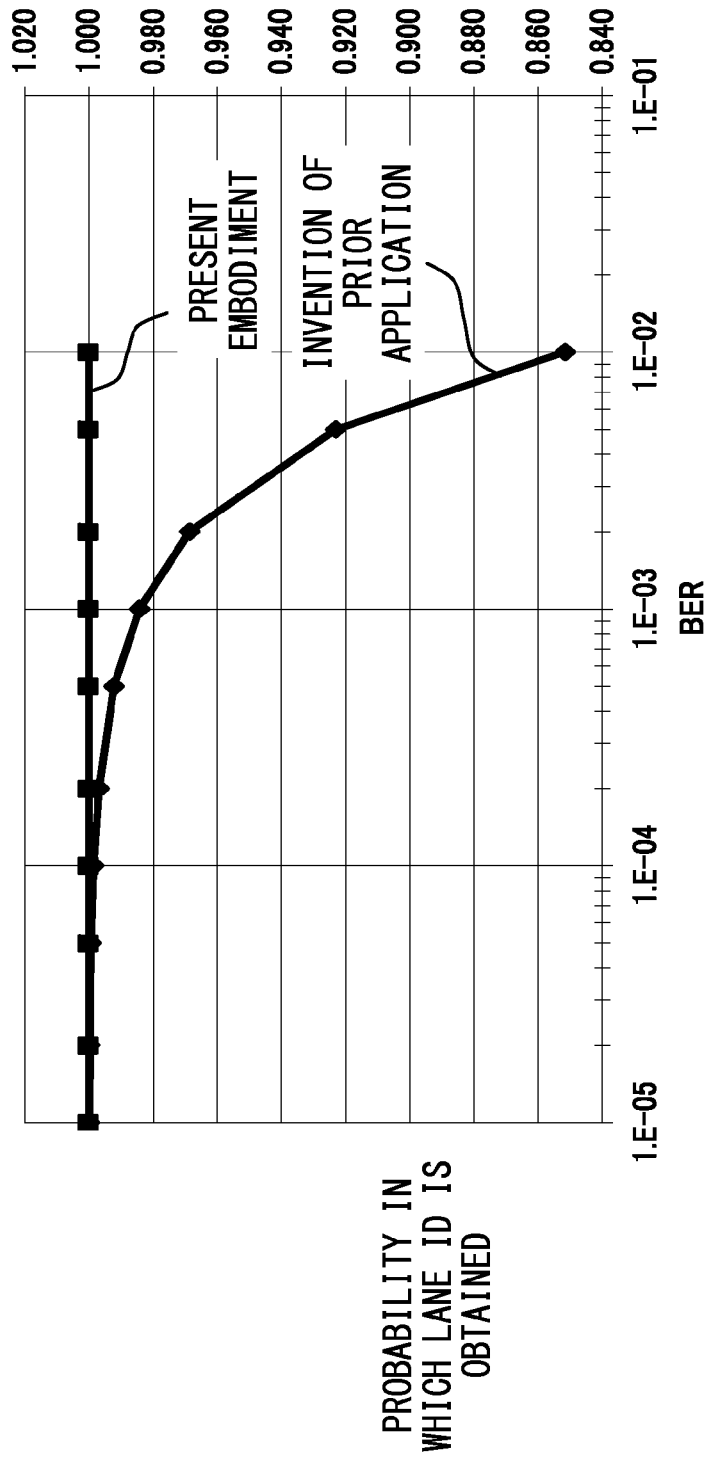
FIG. 20 is a diagram where the probability in which the lane ID is obtained for the BER is compared between the embodiment and the invention of the prior application.

FIG. 20 is a diagram where the probability in which the lane ID is obtained for BER is compared between the present embodiment and the invention of the prior application. As illustrated in FIG. 20, in the invention of the prior application where sequence numbers corresponding to the frame number are set as lane IDs, the probability in which the lane ID is accurately obtained is significantly reduced in cases where the BER becomes larger than $10^{-4}$. By comparison, in the present embodiment, the probability in which the lane ID is obtained is not reduced even if the BER becomes larger than $10^{-4}$ unlike the invention of the prior application. Accordingly, the setting of the lane ID and the detecting method according to the present embodiment is particularly advantageous under the circumstances where the BER becomes larger than $10^{-4}$.

The result of the lane ID detection performed by the lane ID detectors 222C according to a majority method is provided to the lane allocation detector 222E. Upon receiving the detection result from the lane ID detectors 222C, the lane allocation detector 222E detects one lane ID having a single bit array which is different from the other lane IDs corresponding to the respective physical lanes, and determines that the detected lane ID corresponds to the first (or the last) logical lane out of the logical lanes. By combining the determination result and the relative relationship of the timing at which the FAS is detected, as indicated by the result of detection performed by the FAS timing detector 222D, the order of the physical lanes corresponding to the order of the logical lanes at the transmitting end is determined, and a table of physical lanes and logical lanes is created (S13 in FIG. 18).

Figure 21:
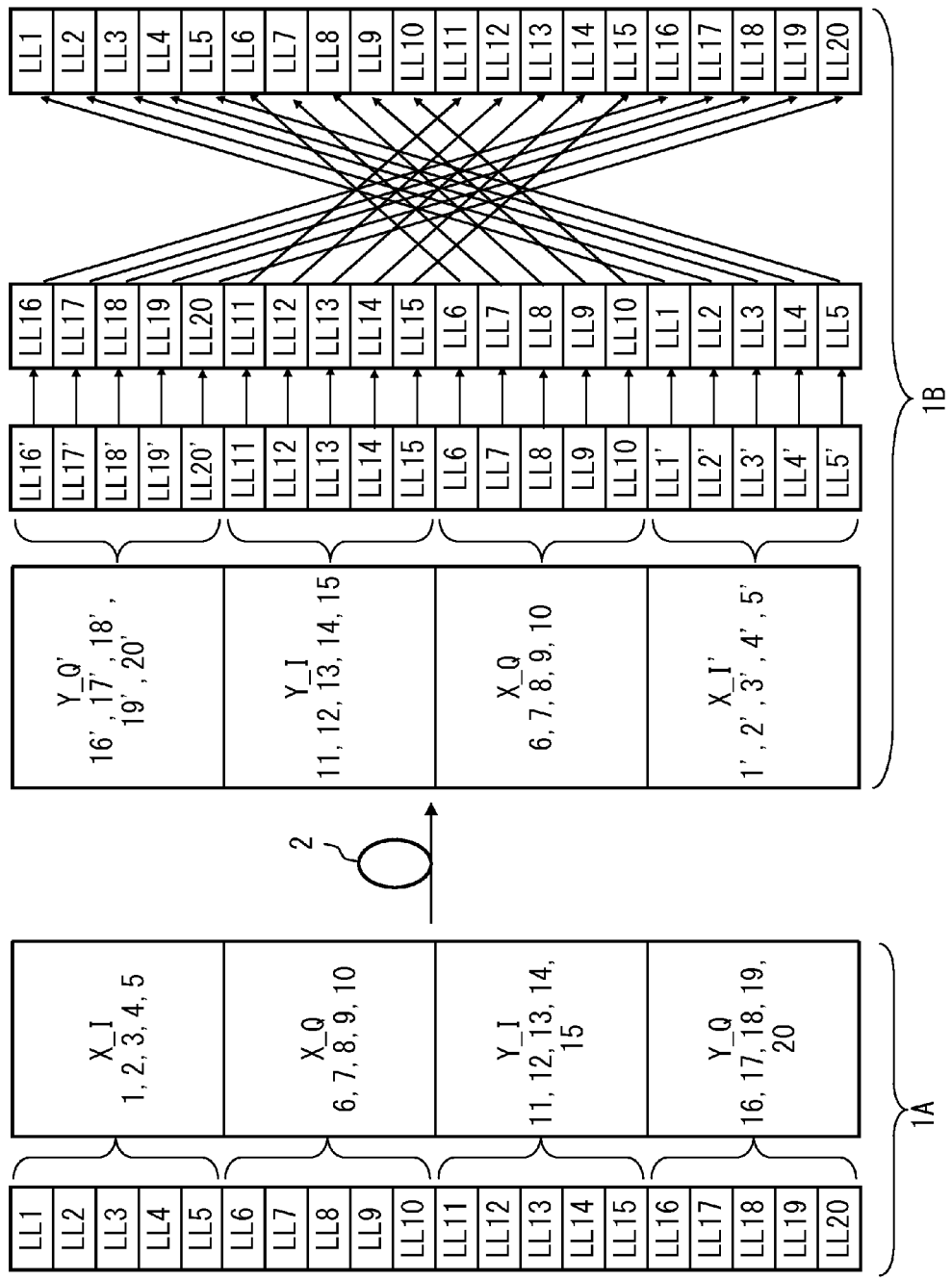
FIG. 21 is a diagram illustrating an example of the inversion of bits and the swapping of lanes according to the multiplexing method of FIG. 8.

FIG. 21 is a diagram illustrating the inversion of bits and the swapping of lanes in a certain operating environment of the system. The example of FIG. 21 corresponds to the case of FIG. 8 in which the data strings of the respective logical lanes LL1 to LL20 are multiplexed at 5:1 at the transmitting end. In this example, through the transmission of the optical signal of the DP-QPSK, the data signals X_I and X_Q corresponding to the I component and the Q component of the X-polarization are swapped for the data signals Y_Q and Y_I corresponding to the Q component and the I component of the Y-polarization, and also the inversion of bits occurs to the I component of the X-polarization and the Q component of the Y-polarization, thereby obtaining data signals X_I' and Y_Q' at the receiver side.

FIG. 22 is a diagram illustrating a table of the physical lanes and the logical lanes created by the lane allocation detector 222E in the above-mentioned situation of FIG. 21. For example, the physical lane PL1 corresponds to a logical lane LL16' contained in the data signal Y_Q' which corresponds to the Q component of the Y-polarization subjected to the inversion of bits, and the FAS is detected in the data strings that have passed through the logic inverter 222A. Accordingly, in the table of FIG. 20, with respect to the physical lane PL1, the logical lane LL is 16, and the logic inversion is on. Moreover, for example, the physical lane PL6 corresponds to the logical lane LL11 contained in the data signal Y_I which corresponds to the I component of the Y-polarization, and the FAS is detected in the data strings that have not passed through the logic inverter 222A. Accordingly, in the table of FIG. 22, with respect to the physical lane PL6, the logical lane LL is 11, and the logic inversion is off.

Figure 23:
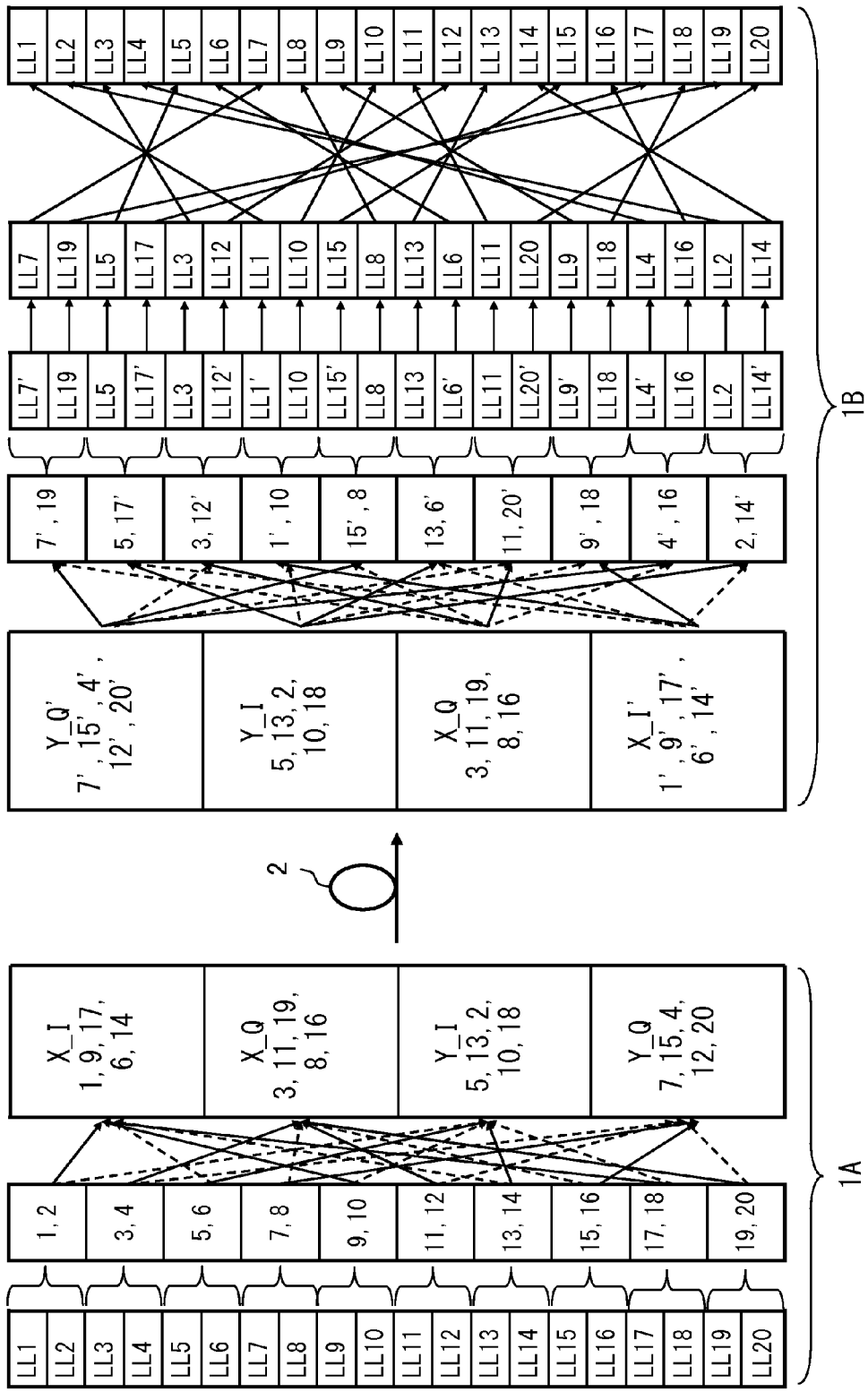
FIG. 23 is a diagram illustrating an example of the inversion of bits and the swapping of lanes according to the multiplexing method of FIG. 9.

FIGS. 23 and 24 illustrate a case in which the data strings of the logical lanes LL1 to LL20 are multiplexed at 2:1 and then multiplexed at 10:4 at the transmitting end of FIG. 9. Also in this case, as illustrated in FIG. 23, through the transmission of the optical signal of the DP-QPSK, the data signals X_I and X_Q corresponding to the I component and the Q component of the X-polarization are swapped for the data signals Y_Q and Y_I corresponding to the Q component and the I component of the Y-polarization, and the inversion of bits occurs to the I component of the X-polarization and the Q component of the Y-polarization, thereby obtaining the data signals X_I' and Y_Q'. In this situation, for example, the physical lane PL1 corresponds to a logical lane LL7' contained in the data signal Y_Q' which corresponds to the Q component of the Y-polarization subjected to the inversion of bits, and the FAS is detected in the data strings that have passed through the logic inverter 222A. Accordingly, in the table of FIG. 24, with respect to the physical lane PL1, the logical lane LL is 7, and the logic inversion is on. Moreover, the physical lane PL2 corresponds to the logical lane LL19 contained in the data signal X_Q which corresponds to the Q component of the X-polarization, and the FAS is detected in the data strings that have not passed through the logic inverter 222A. Accordingly, in the table of FIG. 24, with respect to the physical lane PL2, the logical lane LL is 19, and the logic inversion is off.

When an abnormality is present in the processing performed by the FAS detectors 222B or the lane ID detectors 222C which correspond to the physical lanes and it is difficult to create a table of the above-described physical lanes and the logical lanes, the lane allocation detector 222E creates a re-tracking signal for instructing the received signal processor 212 to optimize the processing by the waveform distortion compensator 212B and the polarization demultiplexer 212C (see FIG. 13) (in particular, reassessment of the coefficients or the like of a digital filter) (S14, S15 in FIG. 18). After receiving the re-tracking signal from the lane allocation detector 222E, the received signal processor 212 optimizes the operations of the waveform distortion compensator 212B and the polarization demultiplexer 212C, and the FAS detection process and the lane ID detection process are performed again (S16).

When a table of the physical lanes and the logical lanes are appropriately created by the lane allocation detector 222E, the lane allocation detector 222E generates a control signal for instructing the matrix switch 222D to swap among the logical lanes whose states are different from the state at the time of the transmission with reference to the table (S17). As the connection state between the input ports and the output ports of the matrix switch 222F is switched according to the control signal (S18), the data strings arranged in the same logical lanes LL1 to LL20 as those at the time of the transmission (see FIGS. 21 and 23) are output from the matrix switch 222F to the OTUk frame recovery 223.

In the OTUk frame recovery 223, the data strings of the respective logical lanes LL1 to LL20 are rearranged for every 16 bytes in accordance with an inverse procedure to the OTL processing at the transmitting end (S19 in FIG. 18), and also the byte of the FAS that has been replaced with the lane ID is returned to the original value (S20). Accordingly, the synchronization of the OTUk frame is confirmed (S21), and the data signal stored in the OTUk frame is output to the OTUk frame processor 23.

As described above, according to the optical transmission system of the present embodiment, the data stored in the OTUk frame is rearranged into a plurality of logical lanes such that the speed of the signal processing will increase, and at least one byte of the FAS corresponding to one of the logical lanes is set to a value different from that of the bytes of the FAS corresponding to the other remaining logical lanes as a lane ID which is used to detect in what logical lane out of a plurality of logical lanes the start of the data string of the frame is arranged. Moreover, an optical signal of the multi-level modulation is transmitted, and the lane ID is detected at the receiving end according to a majority method. Accordingly, it becomes possible to precisely detect the lane ID even under the circumstances in which a bit error can occur at a relatively high probability, and it also becomes possible to securely compensate for the inversion of bits and the swapping of lanes that occur to the received data depending on the operating environment of the system.

In the above-described embodiment, cases in which the lane ID detectors 222C corresponding to the physical lanes detect the lane ID according to a majority method have been described. However, a configuration in which the setting of the lane ID and the detecting method are switched depending on expected BER in the system is possible. For example, it is possible to switch between the setting of the lane ID and the detecting method according to the present embodiment and the setting of the lane ID and the detecting method according to the invention of the prior application in synchronization with the FEC applied to the system. In particular, when the RS-FEC of the G.709 standards of the OTN is applied, a first mode in which sequence numbers corresponding to the frame number are set as lane IDs, and the lane IDs are detected at the receiving end by using a pattern detection is selected. On the other hand, when a higher-performance FEC different from the RS-FEC is applied, a second mode in which at least one byte of the FAS corresponding to one of the logical lanes is set to a value different from that of the bytes of the FAS corresponding to the other remaining logical lanes as a lane ID, and the lane ID is detected at the receiving end according to a majority method is selected. Accordingly, it is possible to achieve a flexible management based on the expected BER in the system.

In the above-described embodiment, an example of the DP-QPSK as the multi-level modulation has been described, but the present invention is not limited to such an embodiment. The present invention may also be applied to a multi-level phase modulation in which no polarization multiplexing is used (for example, 8 PSK), a multi-level Quadrature Amplitude Modulation (QAM) in which the phase and the amplitude are combined (for example, 16 QAM), or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. An optical transmission system including a transmitter which transmits to a transmission line an optical signal of multi-level modulation capable of transmitting a plurality of bits in one symbol time, and a receiver which receives the optical signal through the transmission line, the transmitter comprising:
  a frame divider to rearrange a data string stored in a specified frame into a plurality of logical lanes, and to assign a lane ID, which specifies in what logical lane out of the plurality of logical lanes a start of the data string of the frame is arranged after the data string is rearranged, to a non-scrambled area in an overhead portion of the frame; and
  an optical transmitter module to multiplex the data string rearranged into the plurality of logical lanes by the frame divider according to the multi-level modulation, and to generate the optical signal of the multi-level modulation by modulating a light in accordance with the multiplexed data signal to transmit the generated optical signal to the transmission line,
wherein the lane ID corresponding to one of the plurality of logical lanes is different from the lane IDs corresponding to the other remaining logical lanes, and
the receiver comprising:
  an optical receiver module to recover data from the optical signal and to rearrange a bit string of the data into a same number of physical lanes as that of the plurality of logical lanes; and
  a frame recovery to detect each of the lane IDs contained in the data string of the physical lanes according to a majority method, to detect an inversion of bits and a swapping of lanes for each of the physical lanes according to the detection result of the lane ID to compensate for the inversion of bits and the swapping of lanes such that the data string of the physical lanes is in a same state as that of the data string of the logical lanes, to rearrange the compensated data string of the logical lanes so as to regenerate the frame, and to remove the lane ID from the non-scrambled area.

2. The optical transmission system according to claim 1, wherein
the lane ID corresponding to one of the plurality of logical lanes has a bit array that is an inversion of the lane IDs corresponding to the other remaining logical lanes.

3. The optical transmission system according to claim 1, wherein a skew between the physical lanes is within a half of a time period obtained by dividing a time period corresponding to a length of the frame by a number of the logical lanes.

4. The optical transmission system according to claim 1, wherein
the frame divider replaces at least one byte in a FAS (Frame Alignment Signal) of an OTUk frame of ITU-T with the lane ID.

5. The optical transmission system according to claim 4, wherein
the frame recovery comprises:
a plurality of logic inverters to perform logic inversion on the data string of the physical lanes;
a plurality of FAS detectors to perform a pattern detection of the FAS on the data strings of the physical lanes and the data string output from the logic inverters to output the data string in which the FAS is detected;
a FAS timing detector to detect timing at which the FAS appears in the data strings corresponding to the physical lanes according to results of the pattern detection of the FAS performed by the FAS detectors;
a plurality of lane ID detectors to detect the lane IDs in the data strings output from the FAS detectors according to a majority method;
a lane allocation detector to detect a relationship between the physical lanes and the logical lanes according to a result of the detection performed by the FAS timing detector and results of the detection performed by the lane ID detectors; and
a matrix switch having input ports and output ports, the number of the input ports being the same as the number of the physical lanes, the number of the output ports being the same as the number of the input ports, the input ports receiving the data string from the lane ID detectors, the input ports and the output ports being connected in accordance with the relationship between the physical lanes and the logical lanes detected by the lane allocation detector.

6. The optical transmission system according to claim 4, wherein
the frame divider replaces at least one of a first byte or a last byte of the FAS with the lane ID.

7. The optical transmission system according to claim 1, wherein
a bit error rate of the optical signal received at the receiver is larger than $10^{-4}$.

8. A method for transmitting an optical signal of multi-level modulation capable of transmitting a plurality of bits in one symbol time through the transmission line, the method comprising:
rearranging a data string stored in a specified frame into a plurality of logical lanes, and assigning a lane ID, which specifies in what logical lane out of the plurality of logical lanes a start of the data string of the frame is arranged after the data string is rearranged, to a non-scrambled area in an overhead portion of the frame, wherein the lane ID corresponding to one of the plurality of logical lanes is different from the lane IDs corresponding to the other remaining logical lanes;
multiplexing the data string rearranged into the plurality of logical lanes according to the multi-level modulation, and generating the optical signal of the multi-level modulation by modulating a light in accordance with the multiplexed data signal to transmit the generated optical signal to the transmission line;
recovering data from the optical signal transmitted through the transmission line and rearranging a bit string of the data into a same number of physical lanes as that of the plurality of logical lanes; and
detecting each of the lane IDs contained in the data string of the physical lanes according to a majority method, detecting an inversion of bits and a swapping of lanes for each of the physical lanes according to the detection result of the lane ID, compensating for the inversion of bits and the swapping of lanes such that the data string of the physical lanes is in a same state as that of the data string of the logical lanes, rearranging the compensated data string of the logical lanes so as to regenerate the frame, and removing the lane ID from the non-scrambled area.

* * * * *